United States Patent
Yamashita et al.

(10) Patent No.: US 6,387,564 B1
(45) Date of Patent: May 14, 2002

(54) NON-AQUEOUS SECONDARY BATTERY HAVING AN AGGREGATION LAYER

(75) Inventors: Masaya Yamashita, Machida; Shunsuke Oki; Yuko Ogawa, both of Kawasaki, all of (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/380,282

(22) PCT Filed: Feb. 27, 1998

(86) PCT No.: PCT/JP98/00839
 § 371 Date: Nov. 29, 1999
 § 102(e) Date: Nov. 29, 1999

(87) PCT Pub. No.: WO98/38688
 PCT Pub. Date: Sep. 3, 1998

(30) Foreign Application Priority Data

Feb. 28, 1997 (JP) ............................................. 9-045937
Feb. 28, 1997 (JP) ............................................. 9-046500
Feb. 28, 1997 (JP) ............................................. 9-046502

(51) Int. Cl.$^7$ ............................. H01M 2/14; H01M 4/04
(52) U.S. Cl. ....................... 429/132; 429/162; 29/623.3
(58) Field of Search .......................... 429/60, 94, 127, 429/128, 131–137, 139, 140, 162, 300–306; 29/623.2, 623.3, 623.4, 623.5

(56) References Cited

U.S. PATENT DOCUMENTS 4,327,163 A * 4/1982 Wheadon
4,925,751 A   5/1990 Shackle et al.

(List continued on next page.)

FOREIGN PATENT DOCUMENTS

EP  0618629 A1  10/1994
JP  48-38323    5/1973

(List continued on next page.)

Primary Examiner—Carol Chaney
Assistant Examiner—Susy Tsang
(74) Attorney, Agent, or Firm—Birch, Stewart, Kolasch & Birch, LLP

(57) ABSTRACT

A non-aqueous secondary battery wherein internal short circuits caused by some kinds of manufacturing processes can be prevented by avoiding the falling of active material particles from end faces of sheet electrodes, and the battery capacity of an electrode plate laminate which can be stored in a battery can of the same size as those of the conventional laminates can be increased without increasing the thickness of the active material layer. In order to realize the features mentioned above, at least one of end face of each of positive electrode active material layers (1b) and negative electrode active material layers (2b) is coated with an aggregation layer of insulating material particles (3F) wherein insulating material particles are bonded with binders. The positive electrode active material layer (1b) is formed in such a size that it may not overhang the negative electrode active material layer (2b) which is paired with the positive electrode active material layer (1b) for a cell layer. A separator is constituted of an aggregation layer of insulating material particles (3B) and is secured to either a positive electrode (1) or a negative electrode (2) or to both of them. The separator is so located that it may cover the entire surface of the positive electrode active material layer (1b) which faces at least the negative electrode (2) and it may not overhang the end faces of the positive and the negative current collector (1a, 2b).

12 Claims, 21 Drawing Sheets

U.S. PATENT DOCUMENTS 5,011,501 A     4/1991  Shackle et al.
5,360,684 A  * 11/1994  Duval et al.
5,547,780 A  *  8/1996  Kagawa et al.
5,631,102 A  *  5/1997  Spillman et al.
5,925,482 A  *  7/1999  Yamashita
6,013,113 A  *  1/2000  Mika

FOREIGN PATENT DOCUMENTS

| | | | |
|---|---|---|---|
| JP | 61-58162 | * | 3/1986 |
| JP | A1-122574 | | 5/1989 |
| JP | U2-150760 | | 12/1990 |
| JP | A2-306550 | | 12/1990 |
| JP | A5-109435 | | 4/1993 |
| JP | A6-302314 | | 10/1994 |
| JP | Y2-2506572 | | 5/1996 |
| JP | A9-500485 | | 1/1997 |
| JP | 09-171818 | * | 6/1997 |
| WO | 95 15589 | | 6/1995 |
| WO | WO-96/23324 | * | 8/1996 |

* cited by examiner

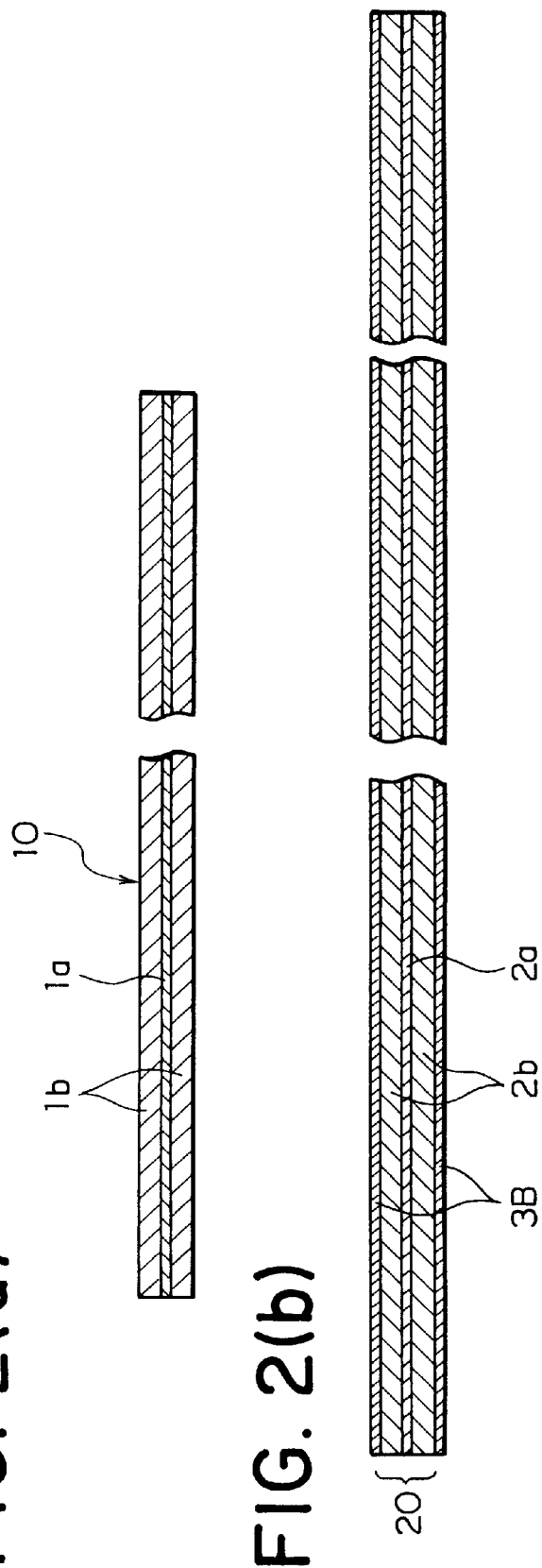

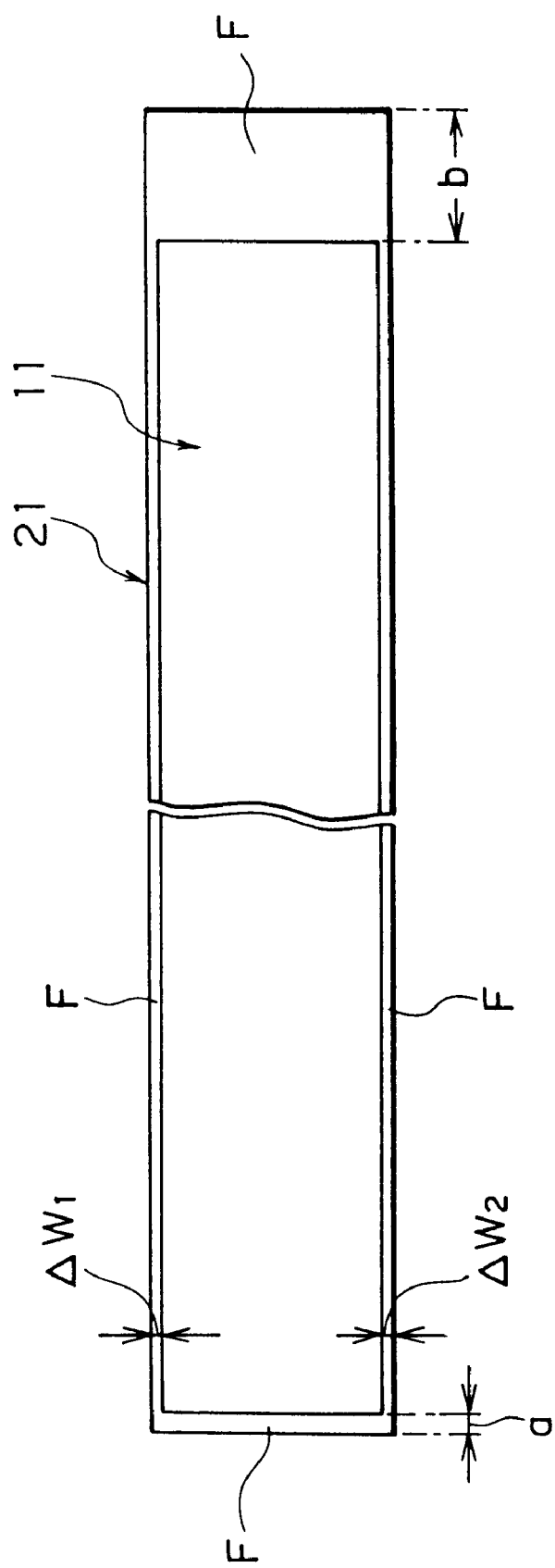

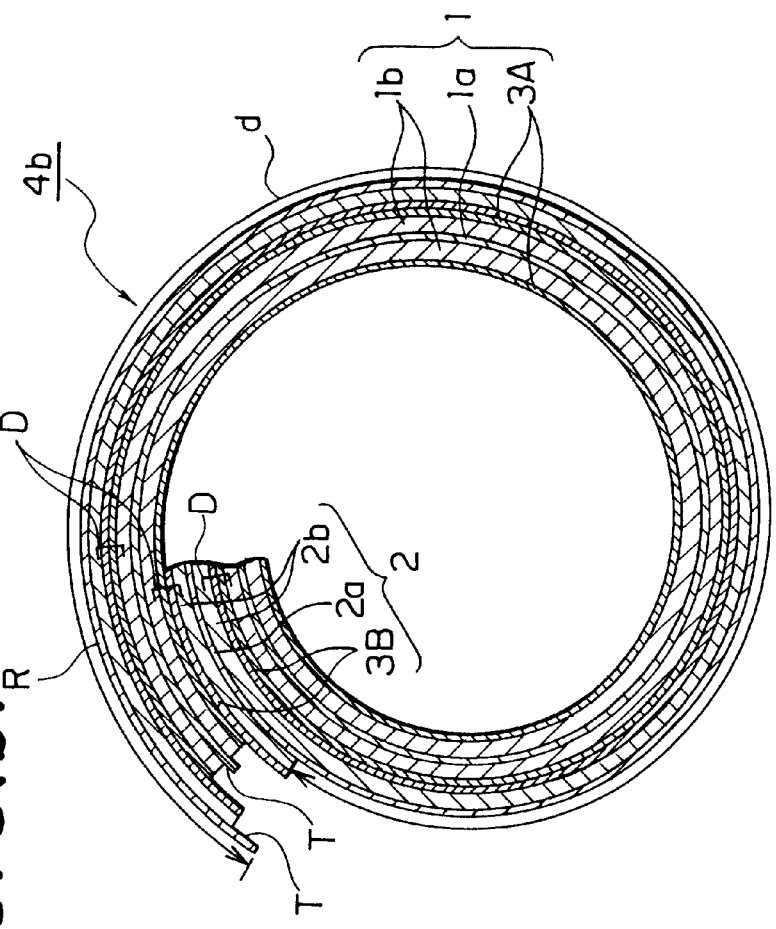
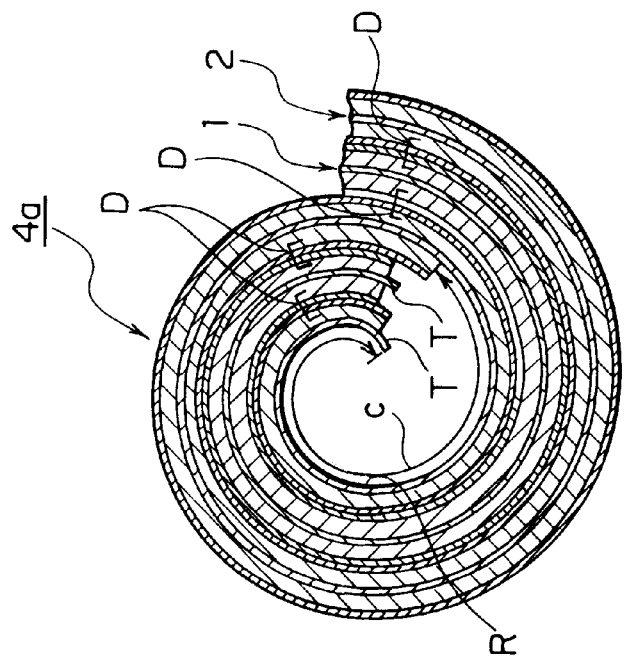
FIG. 8(a)
FIG. 8(b)

LEFT-RIGT DIRECTION ON THE PAPER
IS COATING DIRECTION.

VERTICAL DIRECTION TO THE PAPER
IS COATING DIRECTION.

NON-AQUEOUS SECONDARY BATTERY HAVING AN AGGREGATION LAYER

This application is the national phase under 35 U.S.C. §371 of PCT International Application No. PCT/JP98/00839 which has an International filing date of Feb. 27, 1998, which designated the United States of America.

TECHNICAL FIELD

The present invention relates to a novel non-aqueous secondary battery and a method of manufacturing the same

BACKGROUND ART

In recent years, development for high performance batteries have been proceeded positively along with demands for making electronic equipments to be reduced in the size and the weight and have multiple functions, and adaptable to a cordless system. Recently, lithium ion secondary batteries have, particularly, acquired wide markets more and more because of the light weight is reduced in spite of high voltage, high capacity and high power, compared with secondary batteries used generally so far such as lead storage batteries and nickel-cadmium batteries.

An electrode plate laminate of such a lithium ion secondary battery is usually manufactured by winding or laminating a sheet-like electrode of a predetermined shape cut out of a large sheet-like electrode together with a separator. The sheet-like electrode before cutting is generally manufactured by kneading active material particles together with a binder and a solvent into a slurry, coating he same on a metal foil (current collector sheet), then evaporating the solvent and fixing the active material particles on the metal foil.

Therefore, it may be a worry that active material particles near the end face (cut face) of the sheet-like electrode chip down during manufacture of the electrode plate laminate or upon containment of the laminate into a battery can, to cause internal short circuit with the fallen active material particles. As a result, this lowers the yield of the battery and increases the manufacturing cost.

An object of the present invention is to prevent the falling of the active material particles from the end face of the sheet-like electrode thereby preventing occurrence of internal short circuit caused by manufacturing steps.

Further, an electrode plate laminate of a conventional wound-type battery has been manufactured by spirally winding up strip-like positive electrode, negative electrode and separator. A polyethylene microporous film has been usually used for the separator and it is manufactured, for example, by forming fine pores in a film and then applying stretching.

In such a wound type battery, the width (size in the direction of a winding axis) and a length (winding length) of a separator are designed larger than those of the positive electrode and the negative electrode in view of deviation or the like during winding. Particularly, in the lithium ion secondary battery, the width and the length of the negative electrode are designed to be larger than those of the positive electrode with an aim of preventing short circuit at the ends of electrodes during charge/discharge (refer to Japanese Utility Model Registration No. 2506572).

Accordingly, in a lithium ion secondary battery in particular, since the substantial electrode area of the electrode plate laminate is equal to the entire area of the positive electrode active material layer, the size of the electrode plate laminate (size in the direction of the winding axis) is determined by the width of the separator and the width of the positive electrode is smaller than the width of the negative electrode which is further smaller than that of the separator, then, there is a limit for increasing the area of the positive electrode active material layer for an electrode plate laminate of an identical size. The battery capacity for the battery can of a same size may be increased by increasing the thickness of the active material layer for the positive and negative electrodes, but the film resistance increases as the thickness of the active material layer is increased to lower the output characteristics.

An object of the present invention is to increase the battery capacity of the electrode plate laminate contained in a battery can of a same size without increasing the thickness of the active material layer.

On the other hand, development has been proceeded recently for a sheet-type cell referred to as "polymer battery" that basically utilizes the principle of the lithium ion secondary battery. The positive electrode and the negative electrode of the polymer battery are constituted with the same material as that for the conventional lithium ion secondary battery, but a polymeric solid electrolyte serving both as a separator and an electrolyte, instead of a separator having an electrolyte solution permeability, is interposed between the active materials of both of the electrodes. Then, the polymer battery is manufactured by preparing a flat electrode plate laminate by integrating both of the electrodes and the polymeric solid electrolyte, putting the electrode plate laminate into a flexible casing and sealing the same without pouring the electrolyte solution.

In view of the material and the manufacturing method described above, it has been said that the polymer battery has advantages that the degree of freedom for the battery shape is relatively high, the thickness and the weight can be reduced and the safety is improved. However, since the ionic conductivity of the solid electrolyte is lower compared with the liquid electrolyte used in the lithium ion secondary battery, the polymer battery involves a problem in view of the discharging characteristics at a high current density compared with the lithium ion secondary battery.

Further, when a flat electrode plate laminate is prepared by integrating a conventional separator made of microporous film of polyolefin, instead of the solid electrolyte, between both of electrodes, putting the electrode plate laminate into a flexible casing, pouring electrolyte solution into the casing and sealing that thereby, manufacturing a lithium ion secondary battery, the battery is inferior to the conventional battery of using a metal battery can as a vessel in view of discharging characteristics at a high current density and cycle characteristics. This is attributable to that gaps are liable to be formed between the separator and the electrode since the urging pressure between the electrode and the separator is lower in the flexible casing compared with the metal battery can. Further, it is difficult to integrate the separator comprising the microporous polyolefin film with the electrode in order to prevent the formation of gaps.

As described above, a non-aqueous secondary battery equipped with a flat electrode plate laminate in a flexible casing having a relatively high degree of freedom for battery shape and thin thickness (sheet-type battery), and having characteristics equal to those of conventional lithium ion secondary batteries using the metal battery can as a casing has not yet been obtained.

An object of the present invention is to provide a non-aqueous secondary battery equipped with a flat electrode plate laminate in a flexible container having a relatively high degree of freedom for the battery shape and thin thickness, which is excellent in discharging characteristics at a high current density and cycle characteristics.

DISCLOSURE OF THE INVENTION

The present invention provides a non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein the separator is an aggregation layer of insulating material particles formed by bonding insulating material particles to each other by a binder and fixed to at least one of the positive electrode and the negative electrode, and an end face of at least one of the positive electrode active material layer and the negative electrode active material layer is at least partially coated with the aggregation layer of insulating material particles. The battery is referred to as a first battery according to the present invention.

According to this battery, the chipping down of the active material from the end face of the active material coated with the aggregation layer of insulating material particles can be prevented. Further, short circuit caused by the deformation for the shape of the electrode end face upon being given shock such as by falling down the battery can be prevented. Further, since the coating material is an aggregation layer of insulating material particles having an electrolyte solution permeability, the following effects can be provided.

That is, when the end face of the active material layer is coated with the aggregation layer of insulating material particles having the electrolyte solution permeability, for example, in a non-aqueous secondary battery having an electrode plate laminate prepared by laminating one or more of integrated layers formed by integrating both of the electrodes and a separator, since the aggregation layer of insulating material particles coated at the end face can constitute a path of an electrolyte solution that is entered and released by the expansion and contraction of the electrode active material caused upon charge/discharge, the cycle characteristics are excellent compared with the case of coating by an insulating material having no electrolyte solution permeability.

Further, when the end face of the active material is coated with the aggregation layer of insulating material particles having the electrolyte solution permeability, since the electrolyte solution can be impregnated after the manufacture of the electrode plate laminate, it is advantageous in view of manufacture compared with the case of coating by an insulating material having no electrolyte solution permeability.

Coating of the aggregation layer of insulating material particles may be applied as far as the end face of the current collector.

The insulating material particles constituting the aggregation layer of insulating material particles may be organic or inorganic materials as shown below.

The inorganic materials can include, for example, oxides such as $Li_2O$, $BeO$, $B_2O_3$, $Na_2O$, $MgO$, $Al_2O_3$, $SiO_2$, $P_2O_5$, $K_2O$, $CaO$, $TiO_2$, $Cr_2O_3$, $Fe_2O_3$, $ZnO$, $ZrO_2$ and $BaO$, zeolite, nitrides such as $BN$, $AlN$, $Si_3N_4$ and $Ba_3N_2$, silicon carbide (SiC), carbonates such as $MgCO_3$ and $CaCO_3$, sulfates such as $CaSO_4$ and $BaSO_4$, and zircon ($ZrO_2.SiO_2$), mullite ($3Al_2O_3.2SiO_2$), steatite ($MgO.SiO_2$), forsterite ($2MgO.2SiO_2$) and cordierite ($2MgO.2Al_2O_3.5SiO_2$) as a sort of porcelains.

The organic materials can include, for example, resin particle such as of polyethylene, polypropylene, polystyrene, polyvinyl chloride, polyvinylidene chloride, polyacrylonitrile, polymethyl methacrylate, polyacrylate, fluoro resin such as polytetrafluroethylene and polyvinylidene fluoride, polyamide resin, polyimide resin, polyester resin, polycarbonate resin, plyphenylene oxide resin, silicone resin, phenol resin, urea resin, melamin resin, polyurethane resin, polyether resin such as polyethylene oxide and polypropylene oxide, epoxy resin, acetal resin, AS resin and ABS resin.

Among the insulating material particles, inorganic material particles are preferred and oxide particles are particularly preferred.

The method of forming the aggregation layer of insulating material particles includes a method of dispersing insulating material particles and a binder in a solvent, coating that to a surface for forming the aggregation layer of insulating material particles and then evaporating the solvent.

The binder usable herein can include, for example, latexes (for example, styrene-butadiene copolymer latex, methyl methacrylate-butadiene copolymer latex and acrylonitrile-butadiene copolymer latex), cellulose derivatives (for example, sodium salt and ammonium salt of carboxymethyl cellulose), fluoro rubber (for example, copolymer of vinylidene fluoride, hexafluoropropylene and tetrafluoroethylene) and fluoro resins (for example, polyvinylidene fluoride and polytetrafluoroethylene). Among them, a fluoric binder such as fluoro rubber or fluoro resin is preferred.

The amount of the binder is preferably from $1/500$ to $3/5$, more preferably, from $1/500$ to $1/2$ and, further preferably, from $1/500$ to $1/5$ of the insulating material particles by volume ratio.

Further, the solvent can include, for example, ethyl acetate, 2-ethoxyethanol (ethylene glycol monoethyl ether), N-methyl pyrrolidone (NMP), N, N-dimethyl formamide (DMF), dimethyl sulfoxide (DMSO), tetrahydrofran (THF) and water.

Coating for the end face of the sheet-like electrode with the insulating material may be conducted either before or after the formation of the electrode plate laminate. If it is applied after forming the electrode plate laminate, since mechanical strength at the end face of the electrode plate laminate is increased, pressing fabrication at the upper portion of the battery can after assembling into the battery can is facilitated. Further, this can save assembling of insulating plates to upper and lower portions of the battery can.

When the end face is coated before forming the electrode plate laminate, the thickness T for coating 3F is made greater than or equal to the thickness Tk for the active material layers 1b and 2b (it is made equal to the entire thickness of the sheet-like electrodes 1, 2), as shown, for example, in FIG. 20 so as to cover at least the entire end face of the active material layers 1b and 2b. Further, it is so adapted not to overhang both sides in the direction of the thickness of the sheet-like electrodes 1 and 2.

The width W of the coating is not restricted particularly so long as it is such a width as substantially protecting the active material layer and, in a case of using an existent battery can, the maximum value is determined depending on the size thereof.

Further, the present invention also provides a non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein an end face of at least one of the positive electrode active material layer and the negative electrode active material layer is at least partially coated with the aggregation layer of insulating material particles, the positive electrode active material layer is formed to such a size as not overhanging the negative electrode active material layer paired therewith as a cell layer, and the separator is an aggregation layer of insulating material particles formed by bonding insulating material particles to each other by a binder and fixed to at least one of the positive electrode and the negative electrode, and is disposed so as to cover at least the entire surface of the positive electrode active material layer opposed to the negative electrode and so as not to overhang the end face of the current collector. The battery is referred to as the second battery according to the present invention.

In this battery, at least a portion of the end face of the positive electrode active material layer is preferably coated with the aggregation layer of insulating material particles.

Further, in this battery, the electrode plate laminate preferably comprises one or more of laminated integrated layers each of which is prepared by interposing an aggregation layer of insulating material particles formed by bonding insulating material particles to each other by a binder as a separator between active materials of both of the electrodes and by integrating the separator with both of the electrodes. The battery is referred to as a fourth battery according to the present invention.

In this battery, the separator is constituted with the aggregation layer of insulating material particles in which the insulating material particles are bonded to each other by the binder. In the aggregation layer of insulating material particles, a plurality of insulating material particles may be disposed in the direction of the film thickness, or only one of them may be disposed in the direction of the film thickness so long as the insulating material particles are disposed densely within a film plane.

That is, in the aggregation layer of insulating material particles, gaps between each of the insulating material particles bonded by the binder form voids to permeate ions in the electrolyte solution to pass therethrough, and presence of the insulating material particles inhibits short circuit between the positive electrode active material layer and the negative electrode active material layer. Further, since the gaps between each of the insulator particles are continuous both in the direction of the film thickness and in the direction of the film plane in the aggregation layer, the electrolyte solution is allowed to permeate easily into the positive and negative electrode active material layers.

Since the battery performance of the non-aqueous electrolyte secondary battery such as a lithium ion secondary battery is lowered by the intrusion of water, it is necessary to arrange the circumstance for the entire manufacturing steps such that the water does not intrude, or the electrode plate laminate be dried before pouring the electrolyte solution into the battery can. Upon drying, since the conventional microporous film made of polyolefin resin has low heat resistance, heat shrinkage is caused to the film or the voids are crushed to result in a problem of deteriorating the battery characteristics unless drying for the electrode plate laminate is conducted, for example, in vacuum at a low temperature such as about 80° C. Therefore, the drying needs an extremely long time or the degree of drying is insufficient to result in a worry of water intrusion into the electrolyte solution.

However, since the aggregation layer of insulating material particles formed by using oxides or the like as the insulating material particles is excellent in the heat resistance compared with the microporous film made of polyolefin resin, it can be dried even at a temperature higher than or equal 100° C., so that the foregoing problems can be solved. This can be said to be particularly effective in a case of using, as a positive electrode, lithium manganese composite oxides which is said to be highly sensible to the undesired effects particularly by the intrusion of the water content.

The thickness of the separator comprising the aggregation layer of insulating material particles has no particular restriction and it is preferably from 1 $\mu$m to 100 $\mu$m and, more preferably, from 10 $\mu$m to 50 $\mu$m.

In this battery, the positive electrode active material layer is formed to such a size as not overhanging the negative electrode active material layer paired therewith as a cell layer. That is, in each of the cell layers, the area of the surface of the positive electrode active material layer is made equal to the area of the surface of the negative electrode active material layer or smaller than the same. Then, separator is fixed to at least one of the positive electrode and the negative electrode and disposed so as not to overhang the end face of the current collector.

Therefore, the outer size of the electrode plate laminate is determined depending not on the size of the separator but on the size of the negative electrode. Accordingly, if an electrode plate laminate of an identical size is manufactured, the size of the negative electrode and the positive electrode can be increased than conventional one.

Further, since the separator is disposed so as to cover at least the entire surface of the positive electrode active material layer opposed to the negative electrode, short circuit between the positive electrode and the negative electrode can be prevented.

In this battery, when the electrode plate laminate has an insulating layer interposed between the current collectors of both of the electrodes, it is preferred that the insulating layer is fixed to at least one of the positive and negative current collectors, and disposed so as to cover at least the entire surface of the positive electrode current collector opposed to the negative electrode current collector and so as not to overhang the end face of the current collector.

That is, when an electrode laminate plate comprises a positive electrode and a negative electrode each having an active material layer fixed only on one surface of a current collector, and the positive and negative current collectors are opposed not via the active material layer (for example, in a wound-type using each one of a positive electrode and a negative electrode having an active material layer on one surface), it is necessary to insulate between the positive and negative current collectors on the side not fixed with the active material layer. Since ionic permeability is not required for the portion, it may suffice that an insulating layer with no ionic permeability is interposed and it is preferred that the insulating layer is fixed to at least one of the positive and negative current collectors in the arrangement described above. Further, the insulating layer may also be constituting with the aggregation layer of insulating material particles.

Further, present invention provides a non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution is poured and sealed in the casing, wherein the electrode plate laminate comprises one or more of laminated integrated layers each of which is prepared by interposing an aggregation layer of insulating material particles formed by bonding insulating material particles to each other by a binder as a separator between the active materials of both of the electrodes and by integrating the separator with both of the electrodes, and the casing is a flexible casing. The battery is referred to as a third battery according to the present invention.

When the electrode plate laminate is constituted with an integrated layer formed by integrating the separator and both of the electrodes as described above, no deviation is caused between each of the positive electrode, the separator and the negative electrode upon manufacture of the electrode plate laminate. Further, deviation is not caused when shock or the like is applied after inserting the electrode plate laminate into the casing and sealed. In addition, since the inter-electrode distance does not change, deterioration of characteristics is less caused during charge/discharge at a high current density, and degradation of cycle characteristics can also be reduced.

The method of integrating the separator, namely, an aggregate of the insulating material particles to the surface of the active material layers of both the positive electrode active material layer and the negative electrode active material layer can include, for example, the following three methods.

As the first method, a mixture of insulating material particles and a binder are at first dispersed in a solvent to form a slurry, which is coated on the surface of the active material layer of at least one of the electrodes. Immediately, the other of the electrodes is stacked on this surface such that both the electrode active material layers are opposed via the slurry. Subsequently, they are heated to evaporate the dispersion medium.

As the second method, the slurry described above is at first coated on the surface of the active material layer of at least one of the electrodes and then dried to form a separator layer. Then, the other of the electrodes is stacked such that the active material layers of both of the electrodes are opposed to each other via the separator layer. Subsequently, they are hot pressed to be bonded with each other at such a temperature that the binder is melted.

As the third method, the liquid dispersion described above is at first coated on the surface of the active material layer of at least one of the electrodes and then dried to form a separator layer. Then, a solvent capable of dissolving the binder is coated on the separator layer. Then, the other of the electrodes is stacked such that the active material of both of the electrodes is stacked such that the active material of both of the electrodes are opposed to each other via the separator layer. Then, they are bonded to each other by pressing and drying.

The casing of the battery is a flexible casing and the material therfor is preferably such a material that vapors of water and the non-aqueous solvent can not substantially permeate and that is thin and light in weight to such an extent as not deteriorating the battery performance. They include, for example, metal sheets such as iron sheet, stainless steel sheet and aluminum sheet, and resin sheets such as of polyethylene, polypropylene, ionomer resin, copolymer of ethylene and vinyl alcohol, nylon resin, aromatic polyamide resin, aromatic polyester resin, polyethylene terephthalate resin, polyethylene naphthalate resin, polyphenylene oxide, polyoxymethylene, polycarbonate, polytetrafluoroethylene resin, and polyvinylidene fluoride resin and, if necessary, two or more of such sheets in lamination or two or more of ingredients of sheets mixed or polymerized together may also be used.

The battery according to the present invention has a feature in the structure of the electrode plate laminate as described above and other constituent materials for the battery (for example, electrolyte solution and materials for positive electrode and negative electrode) can be constituted in accordance with the prior art.

Then, constituent materials for the lithium ion secondary battery using the non-aqueous electrolyte is to be explained.

The positive electrode active material used in the lithium ion secondary battery can include lithium composite metal oxides capable of intercalating and deintercalating lithium in an ionic state such as $Li_xM^I_{(1-y)}M^{II}_yO_2$ ($0<x\leqq1.1$, $0\leqq y\leqq1$, $M^I$ and $M^{II}$ each represents at least one element selected from Co, Cr, Mn, Fe and Ni), $Li_xMn_{(2-y)}M_yO_4$ ($0<x\leqq1.1$, $0\leqq y\leqq1$, M represents at least one element selected from Li, Al, Cr, Fe, Co, Ni and Ga).

The negative electrode active material used in the lithium ion secondary battery can include carbonaceous materials such as coke, graphite and amorphous carbon and metal oxides and alloys including Si, Ge, Sn, Pb, Al, In, Zn and the like capable of intercalating and deintercalating lithium in an ionic state.

The electrode active material described above is mixed with a binder and a solvent to form a slurry, coated on the current collector and then dried to obtain an electrode, and examples of the binder in this case can include, for example, latexes (for example, styrene-butadiene copolymer latex, methyl methacrylate-butadiene copolymer latex and acrylonitrile-butadiene copolymer latex), cellulose derivatives (for example, sodium salt and ammonium salt of carboxymethyl cellulose), fluoro rubber (for example, copolymer of vinylidene fluoride, hexafluoropropylene and tetrafluoroethylene) and fluoro resins (for example, polyvinylidene fluoride and polytetrafluoroethylene). Examples of the solvent can include ethyl acetate, 2-ethoxyethanol (ethylene glycol monoethyl ether), N-methyl pyrrolidone (NMP), N,N-dimethyl formamide (DMF), dimethyl sulfoxide (DMSO), tetrahydrofran (THF) and water.

As the non-aqueous electrolyte used for the lithium ion secondary battery, for example, $LiPF_6$, $LiBF_4$, $LiClO_4$, $LiAsF_6$, $CF_3SO_3Li$ and $(CF_3SO_2)_2N.Li$ dissolved solely or as a combination of two or more of them in an organic solvent can be used.

The organic solvent in the non-aqueous electrolyte solution can include, for example, propylene carbonate, ethylene carbonate, γ-butyrolactone, dimethyl sulfoxide, dimethyl carbonate, ethylmethyl carbonate, diethylcarbonate, 1,2-dimethoxyethane, 1,2-diethoxyethane and tetrahydrofurane, which may be used each alone or in admixture of two or more of them (for example, a mixed solvent of a solvent of high dielectric constant and a solvent of low viscosity).

The concentration of the electrolyte in the non-aqueous electrolyte solution is preferably from 0.1 to 2.5 mol/l.

Further, the present invention provides a method of manufacturing a non-aqueous secondary battery, which comprises forming a negative electrode member by fixing a negative electrode active material layer to at least one surface of a sheet-like negative electrode current collector, fixing an aggregation layer of insulating material particles formed by bonding insulating material particles to each other by a binder on the surface of the negative electrode member, then cutting the negative electrode member into a predetermined shape depending on the kind of the battery, thereby preparing a negative electrode having the aggregation layer of insulating material particles fixed thereon as a separator having an electrolyte solution permeability, and forming an electrode plate laminate by using the negative electrode and a positive electrode of a predetermined shape having a positive electrode active material layer fixed to at least one surface of a sheet-like current collector, such that the positive electrode active material layer does not overhang the negative electrode active material layer paired therewith as a cell layer. The method is referred to as a first manufacturing method according to the present invention.

According to this method, an electrode plate laminate of a non-aqueous secondary battery of the present invention, in which the positive electrode active material layer is formed to such a size as not overhanging the negative electrode active material layer paired therewith as a cell layer, and the separator is an aggregation layer of insulating material particles formed by bonding insulating material particles to each other by a binder, fixed to at least one of a positive electrode and a negative electrode and disposed so as to cover at least the entire surface of the positive electrode active material layer opposed to the negative electrode and so as not to overhang the end face of the current collector can be manufactured easily and efficiently.

The electrode plate laminate includes a wound type of cutting a positive electrode, a negative electrode and a separator each into a strip-like shape and then spirally winding them by a winding machine, a zigzag-folded type of cutting them each into a strip-like shape and stacking them in parallel by folding back at a predetermined width and a simple lamination type of cutting them into a circular or square shape and piling them.

Accordingly, when the wound type electrode plate laminate is formed by the method described above for example, the positive electrode is cut such that the width thereof is smaller than the width of the negative electrode, and conducting winding such that a negative electrode active material layer not opposing to the positive electrode active material layer is disposed at a starting portion and an ending portion for winding.

When a zigzag-folded type electrode plate laminate is formed, for example, the positive electrode is cut such that the width thereof is smaller than that of the negative electrode, and they are folded such that a negative electrode active material layer not opposing to the positive electrode active material layer is disposed at a starting portion for folding and an ending portion for folding. When a simple lamination type electrode plate laminate is formed, for example, the positive electrode is cut such that the outer circumferential profile thereof is smaller than that of the negative electrode and then they are stacked with their center being aligned with each other.

Further, the present invention provides a method of manufacturing a non-aqueous secondary battery, which comprises forming a positive electrode member by forming a positive electrode active material layer to at least one surface of a sheet-like positive electrode current collector, within the size of the current collector determined for an electrode plate laminate, such that a margin is present at the periphery, forming an aggregation layer of insulating material particles formed by bonding insulating material particles to each other by a binder to the positive electrode member so as to cover the surface and the end face of the positive electrode active material layer, then cutting the positive electrode member integrated with the aggregation layer of insulating material particles in perpendicular to the plane of the sheet at the position for the margin to prepare a positive electrode having the aggregation layer of insulating material particles fixed thereon as a separator having an electrolyte solution permeability, and forming an electrode plate laminate by using the positive electrode and a negative electrode of a predetermined size having a negative electrode active material layer fixed to at least one surface of a sheet-like current collector, such that the positive electrode active material layer does not overhang the negative electrode active material layer paired therewith as a cell layer. The method is referred to as a second manufacturing method according to the present invention.

According to this method, an electrode plate laminate of a non-aqueous secondary battery of the present invention, in which at least a portion of the end face of the positive electrode active material layer is coated with the aggregation layer of insulating material particles, the positive electrode active material layer is formed to such a size as not overhanging the negative electrode active material layer paired therewith as a cell layer, and the separator is an aggregation layer of insulating material particles formed by bonding insulating material particles to each other by a binder, fixed to the positive electrode and disposed so as to cover at least the entire surface of the positive electrode active material layer opposed to the negative electrode and so as not to overhang the end face of the current collector can be manufactured easily and efficiently.

Further, the present invention provides a method of manufacturing a non-aqueous secondary battery, which comprises forming a positive electrode member by forming a positive electrode active material layer to at least one surface of a sheet-like positive electrode current collector, within the size of the current collector determined for an electrode plate laminate, such that a margin is present at the periphery, forming an aggregation layer of insulating material particles formed by bonding insulating material particle to each other by a binder to the positive electrode member so as to cover the surface and the end face of the positive electrode active material layer, then integrating a negative electrode member having a negative electrode active material layer on at least one surface of a sheet-like negative electrode current collector on the aggregation layer of insulating material particles with the negative electrode active material layer being faced thereto and then cutting the integrated positive electrode member and the negative electrode member in perpendicular to the plane of the sheet at the position of the margin, thereby forming an integrated layer which is formed by interposing an aggregation layer of insulating material particles as a separator having an electrolyte solution permeability between the active materials of both of the electrodes and integrating the separator and both of the electrodes, and laminating the integrated layer by one or more layers to form an electrode plate laminate. The method is referred to as a third manufacturing method of the present invention.

According to this method, an electrode plate laminate of an non-aqueous secondary battery of the present invention, in which at least a portion of an end face of the positive electrode active material layer is coated with the aggregation layer of insulating material particles, the positive electrode active material layer is formed to such a size as not overhanging the negative electrode active material layer paired therewith as the cell layer, the separator is an aggregation layer of insulating material particles formed by bonding the insulating material particles to each other by a binder, fixed to the positive electrode and disposed so as to cover at least the entire surface of the positive electrode active material layer opposed to the negative electrode and disposed so as not to overhang the end face of the current collector, and the electrode plate laminate is formed by laminating one or more of integrated layers which is prepared by integrating both of the electrodes and the separator between the active material layers of both of the electrodes can be manufactured easily and efficiently.

Furthermore, the present invention provides a method of manufacturing a non-aqueous secondary battery, which comprises forming a positive electrode member by forming a positive electrode active material layer to at least one surface of a sheet-like positive electrode current collector, within the size of the current collector determined for an electrode plate laminate, such that a margin is present at the periphery, forming an aggregation layer of insulating material particles formed by bonding insulating material particles to each other by a binder to the positive electrode member so as to cover the surface and the end face of the positive electrode active material layer, then forming a negative electrode active material layer on the aggregation layer of insulating material particles, and then cutting that in perpendicular to the plane of the sheet at the position of the margin, thereby forming an integrated layer which is formed by interposing an insulation material particle aggregation layer as a separator having an electrolyte solution permeability between the active materials of both of the electrodes and integrating the separator and both of the electrodes, and laminating the integrated layer by one or more layers to form an electrode plate laminate. This method is referred as a fourth manufacturing method according to the present invention.

In this embodiment, the negative electrode active material can be functioned as an electrode without a current collector and, when a current collector or the like is fixed to the negative electrode active material layer after drying, a material, for example, a lath mesh (expanded metal having a thickness equal to that of usual current collector) which can be secured to the negative electrode active material layer by press bonding or the like may also be used.

According to this method, an electrode plate laminate of a non-aqueous secondary battery of the present invention, in which at least a portion of the end face of the positive electrode active material layer is coated with the aggregation layer of insulating material particles, the positive electrode active material layer is formed to such a size as not overhanging the negative electrode active material layer paired therewith as a cell layer, the separator is an aggregation layer of insulating material particles formed by bonding the insulating material particles to each other by a binder, fixed to the positive electrode and disposed so as to cover at least the entire surface of the positive electrode active material layer opposed to the negative electrode and so as not to overhang the end face of the current collector, and the electrode plate laminate is formed by laminating one or more of integrated layers prepared by integrating both of the electrodes and the separator between the active material layers of both of the electrodes can be manufactured easily and efficiently.

BRIEF DESCRIPTION OF THE DRAWINGS

FIG. 2(*a*) is a cross sectional view taken along line A—A in FIG. 1(*a*) and FIG. 2(*b*) is a cross sectional view taken along line B—B in FIG. 1(*b*), FIG. 3 is a front elevational view showing the difference of size between the positive electrode and the negative electrode and a way of stacking the positive electrode and the negative electrode upon winding.

FIG. 8 is a cross sectional view showing an electrode plate laminate corresponding to a further embodiment of the second battery according to the present invention (example of disposing an exposed portion of a current collector at the outermost circumference), in which (a) is an inner circumferential portion and (b) is an outer circumferential portion thereof.

BEST MODE FOR PRACTICING THE INVENTION

First Embodiment

Figure 1A:
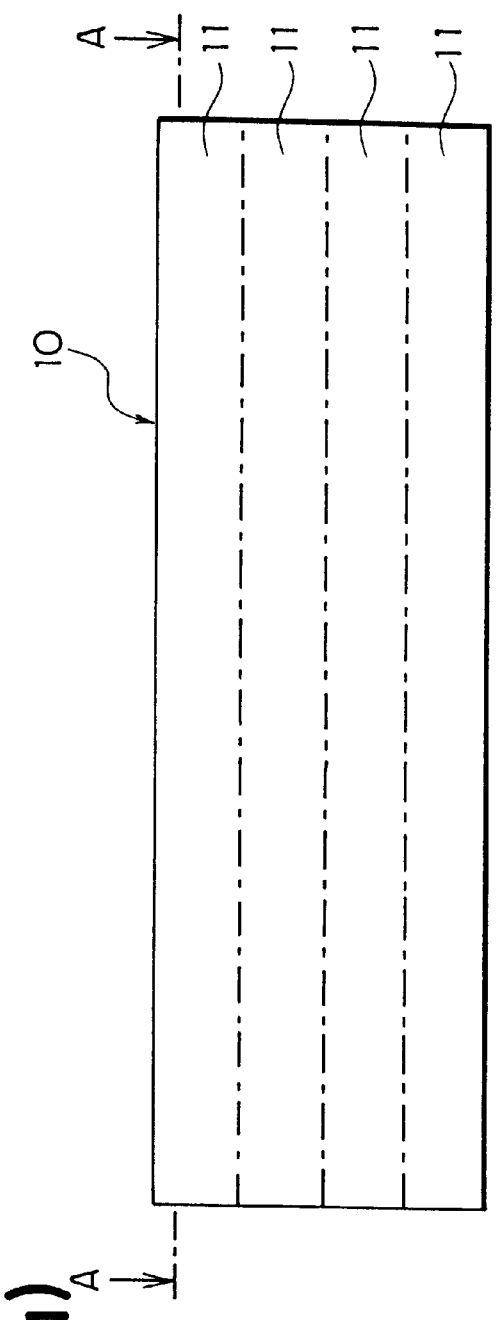
FIG. 1 is an explanatory view showing a method of manufacturing a wound type electrode plate laminate corresponding to an embodiment of a second battery according to the present invention, which is a plan view showing a wide member before cutting into strip-like positive electrode and negative electrode, in which FIG. 1(*a*) is a view for the positive electrode and FIG. 1(*b*) is a view for the negative electrode.

A first embodiment of a battery according to the present invention will be explained below. This embodiment corresponds to an embodiment concerning a second battery and a manufacturing method thereof according to the present invention (the first manufacturing method of the invention).

FIG. 1 to FIG. 4 show a method of manufacturing a wound type electrode plate laminate.

At first, for a positive electrode, a positive electrode active material layer $1b$ is formed entirely on both surfaces of a current collector foil $1a$ to form a positive electrode wide member $10$, as shown in FIG. $1(a)$ (plan view) and FIG. $2(a)$ (cross sectional view taken along line A—A in FIG. $1(a)$).

For a negative electrode, a negative electrode active material layer $2b$ is formed entirely on both surfaces of a current collector foil $2a$ to form a negative electrode wide member $20$, and an aggregation layer of insulating material particles $3B$ is formed over the entire surface of each negative electrode active material layer $2b$, as shown in FIG. $1(b)$ (plan view) and FIG. $2(b)$ (cross sectional view taken along line B—B in FIG. $1(b)$).

Then, as shown in FIGS. $1(a)$ and $1(b)$, each of the positive electrode wide member $10$ and the negative electrode wide member $20$ formed with the aggregation layer of insulating material particles $3B$ is laterally cut into several portions to obtain a positive electrode strip member $11$ and a negative electrode strip member $21$ formed with the aggregation layer of insulating material particles $3B$ respectively. This cutting is conducted as shown in FIG. 3 such that the negative electrode strip member $21$ has a larger size than the positive electrode strip member $11$ by a at one end and by b at the other end in the longitudinal direction (a<b), and by $\Delta W1$, $\Delta W2$ at each end in the lateral direction ($\Delta W1 = \Delta W2$).

Then, the positive electrode strip member $11$ and the negative electrode strip member $21$ formed with the aggregation layer of insulating material particles $3B$ are wound spirally with the negative electrode being at the inner side while stacking them as shown in FIG. 3. That is, only the negative electrode strip member $21$ is wound for a starting portion of winding (length a) of the electrode plate laminate and subsequently the positive electrode strip member $11$ and the negative electrode strip member $21$ formed with the aggregation layer of insulating material particles $3B$ are wound together with their lateral centers being aligned.

FIG. $4(a)$ shows an inner circumferential portion $4a$ and FIG. $4(b)$ shows an outer circumferential portion $4b$ of the electrode plate laminate. As can be seen from FIG. $4(b)$, only the negative electrode $2$ is wound for the length d at the outermost circumference in the electrode plate laminate, and the length of the negative electrode is set so as to ensure the length d for the outermost circumference.

In this embodiment, the negative electrode active material layer $2b$ at the innermost circumference (length c) and the negative electrode active material layer $2b$ at the outermost circumference (length d) do not constitute a cell layer in the longitudinal direction (winding direction of the electrode plate laminate), but, in the portion except them, the positive electrode active material layer $1b$ and the negative electrode active material layer $2b$ opposed to each other via the aggregation layer of insulating material particles $3B$ as a separator constitute a cell layer D.

Then, the negative electrode active material layer $2b$ is not opposed to the positive electrode active material layer $2b$ for the starting portion of winding (length a) of the cell layer Da at the innermost circumference and the end portion of winding (length e) of the cell layer De at the outermost circumference. That is, the cell layer Da at the innermost circumference and the cell layer De at the outmost circumference include a portion (sole portion) F of the negative electrode active material layer 2b not opposed to the positive electrode material layer 1b.

Further, since the negative electrode 2 is formed larger by ΔW1, ΔW2 at respective ends in the lateral direction (direction of the winding axis of the electrode plate laminate), sole portions F of the negative electrode active material layer 2b are also present in this portion.

As described above, in the electrode plate laminate in this embodiment, since the negative electrode 2 is cut into a size larger than the positive electrode 1 both in the longitudinal direction and the lateral direction, and they are wound with stacking such that the positive electrode 1 does not overhang the negative electrode 2, the sole portion F of the negative electrode active material layer 2b is formed for the entire end portion of the positive and negative electrodes paired as the cell layer D. Accordingly, in the lithium ion secondary battery having the electrode plate laminate of the constitution described above, since the doping amount of the lithium ions is less saturated in the vicinity of the end portion of the negative electrode by the presence of the sole portion F of the negative electrode active material layer 2b, internal short circuit upon charge/discharge can be prevented.

Further, since the aggregation layer of insulating material particles 3B as the separator is fixed to the negative electrode active material layer 2b, the width of the separator can be identical with the width of the negative electrode 2. Therefore, since the width of the positive electrode 1 designed smaller than the negative electrode 2 for the purpose described above can be made larger than conventional one, the area of the positive electrode 1 of the electrode plate laminate contained in a battery can of an identical size can be increased.

Figures 5A, 5B, 5C:
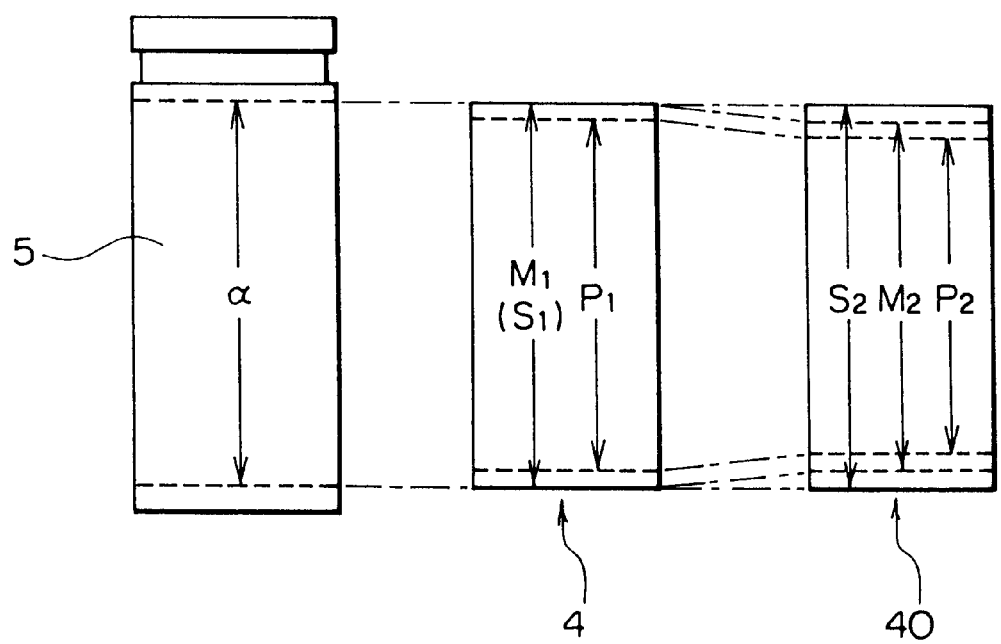
FIG. 5 is a view showing a relation between a battery can and an electrode plate laminate, and a relation between the length of the electrode plate laminate, the width of the positive electrode, the width of the negative elective and the width of the separator, in which (a) shows an outer shape of the battery can, (b) shows a electrode plate laminate of the battery of an embodiment and (c) shows an electrode plate laminate of a conventional battery, respectively.

That is, as shown in FIG. 5(a), the height α of an electrode plate laminate contained is determined depending on the size of the battery can 5 and, in the electrode plate laminate 4 of this embodiment, as shown in FIG. 5(b), the width M2 of the negative electrode 2 and the width S1 of the separator (aggregation layer of insulating material particles) 3B can be made equal to the height α of the electrode plate laminate 4. On the contrary, in the conventional electrode plate laminate 40, as shown in FIG. 5(c), the width S2 of the separator is made equal to the height α of the electrode plate laminate and the width M2 of the negative electrode 2 is made smaller, for example, by about 2.0 mm. In each of the cases, each width P1, P2 for the positive electrode 1 is made smaller, for example, within a range from 0.5 to 2.0 mm than each width M1, M2 of the negative electrode plate 1 with an aim of preventing internal short circuit as described above.

As a result, if the active material layer is formed with an identical thickness, since the amount of the active material layer is increased by so much as the increase of the area, the battery capacity of the electrode plate laminate 4 in FIG. 5(b) can be increased compared with the conventional electrode plate laminate 40 in FIG. 5(c). Further, if the amount of the active material contained in a battery can of an identical volume is made identical, the thickness of the active material layer can be reduced by so much as the increase of the area without decreasing the battery capacity. Further, since the current density per unit area is lowered by the increase of the area and the film resistance is reduced by decreasing in the thickness of the active material layer, output characteristics can be improved.

Explanations are to be made for examples comparing battery capacity between conventional typical batteries and batteries corresponding to this embodiment (Examples 1–6, Comparative Examples 1–2).

The following materials were prepared as the electrode.

For the positive electrode, there were used $LiCoO_2$ as a positive electrode active material, flaky graphite and acetylene black as a conductive filler, and a fluoro rubber as a binder. They were mixed in a mixed solvent of ethyl acetate and 2-ethoxyethanol (ethyl acetate:2-ethoxyethanol=1:3 by volume ratio) at a ratio of $LiCoO_2$:flaky graphite:acetylene black:fluoro rubber=100:2.5:2.5:1.98 by weight to form a slurry.

The slurry was coated on both surfaces of an aluminum foil (positive electrode current collector) 1a of 15 μm thickness, and dried and applied with pressing to form a positive electrode wide member 10 having a positive electrode active material layer 1b at a thickness of 87 μm per one surface.

For the negative electrode, there were used mesophase pitch carbon fiber graphite and flaky graphite as a negative electrode active material, carboxymethyl cellulose as a dispersant and a latex as a binder. They were mixed in purified water at a ratio of mesophase pitch carbon fiber graphite:flaky graphite:carboxymethyl cellulose:latex=90:10:1.4:1.8 by weight, to obtain a slurry.

The slurry was coated on both surfaces of a copper foil (negative electrode current collector) 2a of 12 μm thickness, dried and applied with pressing to form a negative electrode wide member 20 having a negative electrode material layer 2b at a thickness of 81 μm per one surface.

Then, the aggregation layer of insulating material particles (separator) was formed and the electrode plate laminate was manufactured as described below.

There were prepared $\alpha$-$Al_2O_3$ powder (average grain size for 50%: 0.7 μm) as insulating material particles, a powder of polyvinylidene fluoride (PVDF) (KF#1100, manufactured by Kureha Chemical Industry Co. Ltd.) as a binder and N-methylpyrrolidone (NMP) as a solvent. Then, they were mixed in the state of powder at a ratio of $\alpha$-$Al_2O_3$:PVDF=100:5 by weight, to which NMP was added and mixed further to obtain a slurry with a solid content of 56.8% by weight.

The slurry was coated on the positive electrode active material layer 1b of the positive electrode wide member and the negative electrode active material layer 2b of the negative electrode wide member uniformly by using a die coater, which was dried in a drying furnace at 120° C. for 2 min. to fix a separator 3A on the positive electrode active material layer 1b and a separator 3B on the negative electrode active material layer 2b, each separator comprising the aggregation layer of insulating material particles of 12 μm thickness.

An electrolyte solution prepared by dissolving, 1.0 mol/l of $LiPF_6$ into a mixed solvent of ethylene carbonate (EC) and diethyl carbonate (DEC) at 1:1 volume ratio was provided. The electrode plate laminate of this embodiment manufactured by the method described above was contained together with the electrolyte solution into a battery can and then sealed to manufacture a cylindrical lithium ion secondary batteries of 18650 size (18 mm diameter, 65 mm height) and 17500 size (17 mm diameter, 50 mm height).

As a comparative example, a conventional cylindrical lithium ion secondary battery using a microporous film made of polyethylene as a separator was also manufactured.

The batteries on each size of the example and the comparative example were made identical for the matters of the positive electrode and the negative electrode except for the width (the length and the thickness of the active material layer, for example) and the width and the kind of the separator.

Charge/discharge were conducted for the thus manufactured batteries in a thermostable bath at 20° C. under the following conditions.

Charging:

Charging at constant current and constant voltage for 5 hours in total with an upper limit voltage of 4.2 V and a current density of 0.5 mA/cm$^2$.

Discharging:

Constant current discharging till termination voltage of 2.7 V with a current density of 0.5 mA/cm$^2$.

The following Tables 1 and 2 show the results for the comparison of battery discharging capacity. Table 1 shows the result for 18650 size and Table 2 shows the result for 17500 size.

TABLE 1

|  | Separator width | Negative electrode width | Positive electrode width | Capacity (relative value) |
| --- | --- | --- | --- | --- |
| Comparative Example 1 | 58.0 mm | 56.0 mm | 53.5 mm | 100 |
| Example 1 | 57.0 mm | 57.0 mm | 54.5 mm | 101.9 |
| Example 2 | 58.0 mm | 58.0 mm | 55.5 mm | 103.7 |
| Example 3 | 57.0 mm | 58.0 mm | 55.5 mm | 103.7 |

TABLE 2

|  | Separator width | Negative electrode width | Positive electrode width | Capacity (relative value) |
| --- | --- | --- | --- | --- |
| Comparative Example 2 | 44.0 mm | 41.5 mm | 40.0 mm | 100 |
| Example 4 | 43.0 mm | 43.0 mm | 41.5 mm | 103.8 |
| Example 5 | 44.0 mm | 44.0 mm | 42.5 mm | 106.3 |
| Example 6 | 43.0 mm | 44.0 mm | 41.5 mm | 103.8 |

From the results shown in Tables 1 and 2, it can be seen that the battery capacity can be increased by about 2 to 10% in the batteries the examples compared with the batteries of comparative examples, while the degree of effects are different depending on the size of battery cans.

In this embodiment, the electrode plate laminates were prepared by using positive and negative electrodes in each of which the active material layer was fixed on both surfaces of the current collector, but it is not restricted only thereto and those having the active material layer fixed to only one surface of the current collector for either one of the positive electrode and the negative electrode, or both the positive electrode and the negative electrode may be used.

Figure 6:
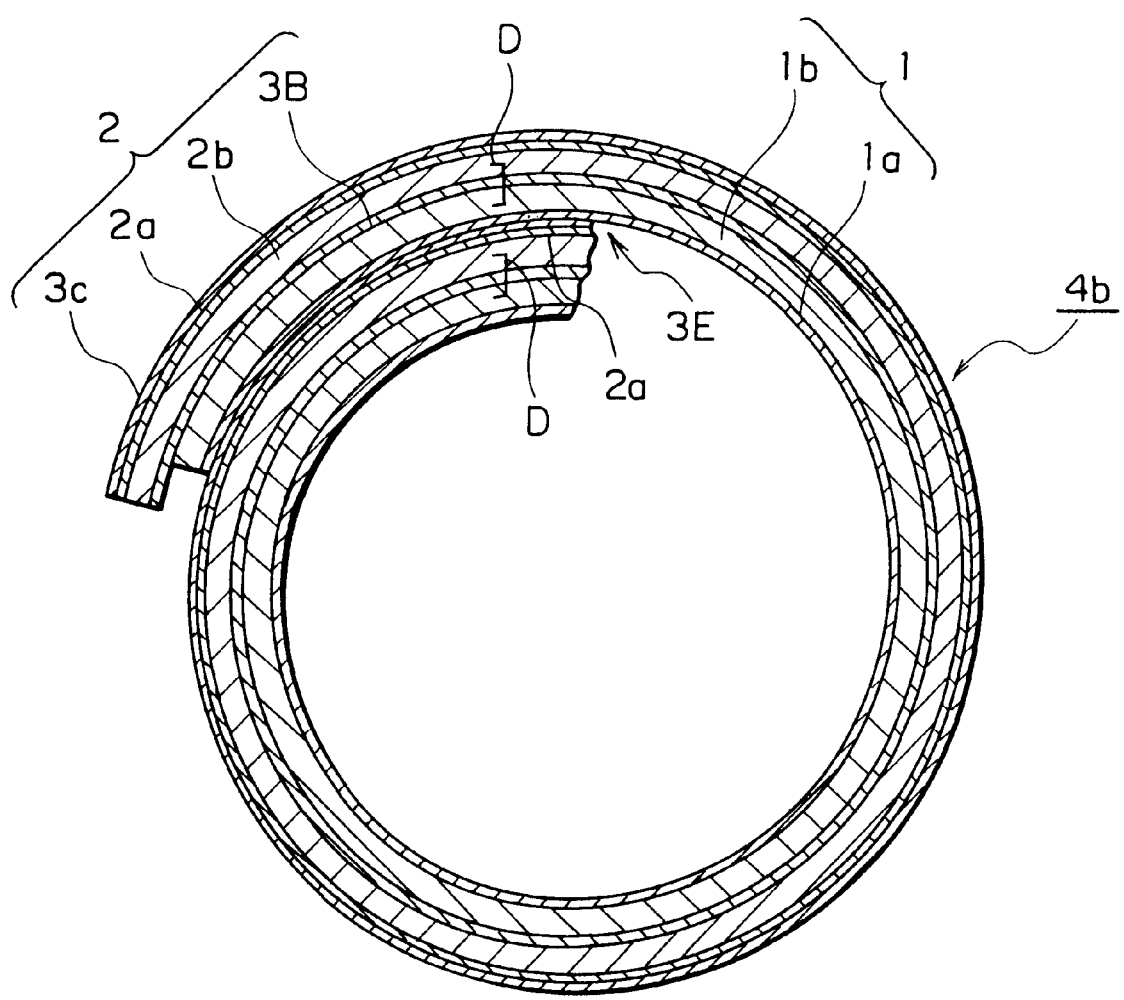
FIG. 6 is a cross sectional view showing an outer circumferential portion of an electrode plate laminate corresponding to another embodiment of the second battery according to the present invention (example of fixing an active material layer only to one surface of a current collector of both the positive electrode and the negative electrode).

FIG. 6 shows an example of using each one of the positive electrode and the negative electrode both of which have the active material layer fixed only on one surface of the current collector and, in this embodiment, it is necessary to form an insulating layer between the positive and negative current collectors. For this purpose, in this embodiment, a wide member from which a negative electrode 2 is cut out is manufactured by forming an active material layer 2b on one surface of a current collector 2a, on which an aggregation layer of insulating material particles 3B as a separator is formed, and by forming an aggregation layer of insulating material particles 3E also on the other surface of the current collector 2a. Further, a positive electrode 1 formed by fixing an active material layer 1b on one surface of a current collector 1a is used.

Figure 4B:
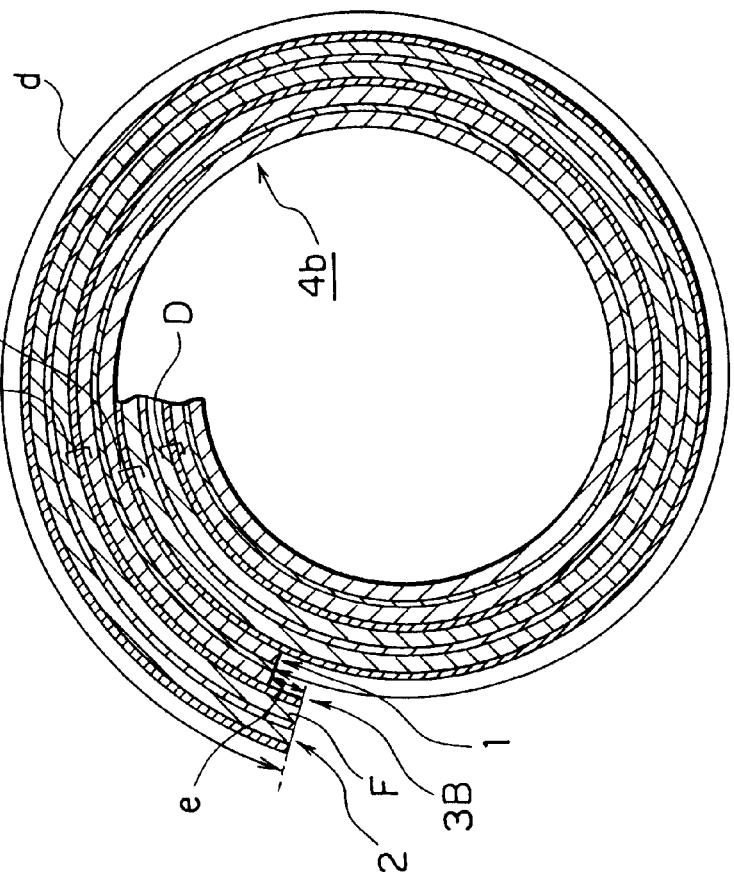
FIG. 4 is a cross sectional view showing an electrode plate laminate manufactured as an embodiment of the second battery according to the present invention, in which (a) shows an inner circumferential portion and (b) shows an outer circumferential portion thereof.
Figure 4A:
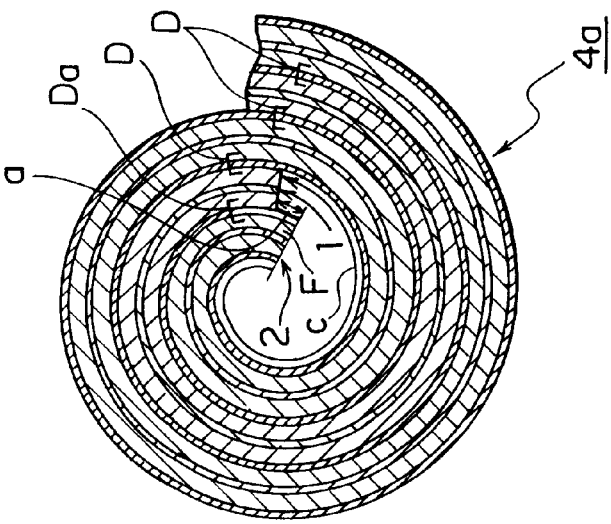

Then, when the positive electrode 1 and the negative electrode 2 are wound in the same manner as in FIG. 4, a separator 3B comprising the aggregation layer of insulating material particles is disposed between the positive and negative active layers 1b and 2b, and the aggregation layer of insulating material particles 3E is disposed between the positive and negative current collectors 1a and 2a.

In this case, since it is not necessary that the aggregation layer of insulating material particles 3E between the positive and negative current collectors 1a and 2a has a function of permeating ions in the electrolyte solution but it only has to provide a function of insulating both of the current collectors from each other, it is not required to constitute the aggregation layer of insulating material particles 3E with the aggregation layer of insulating material particles but it may be constituted by fixing an insulating film to a current collector.

Figure 7A:
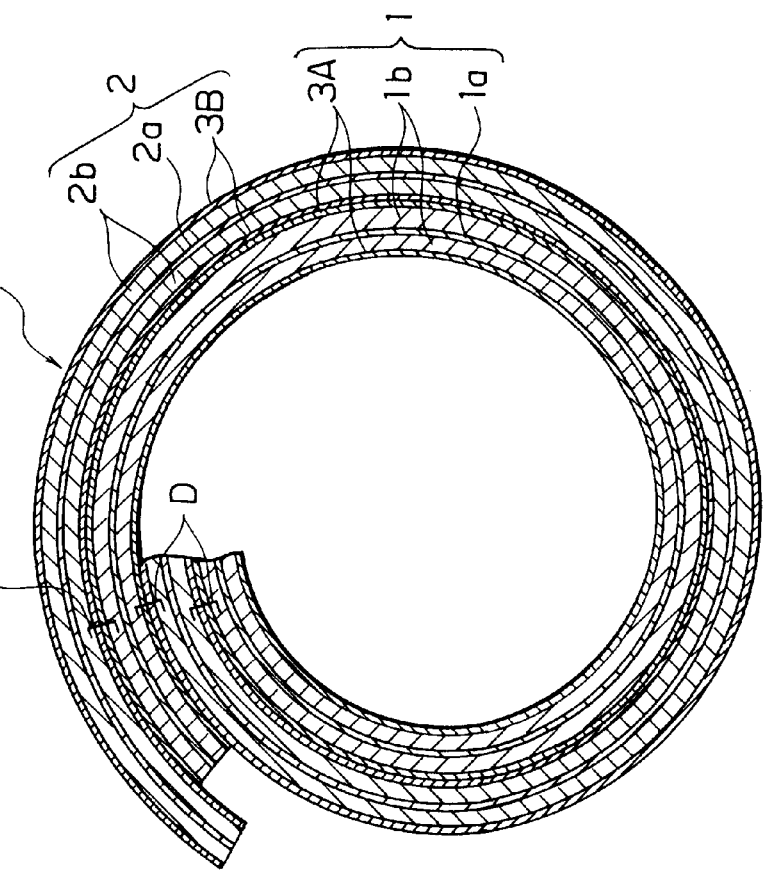
FIG. 7 is a cross sectional view showing an electrode plate laminate corresponding to another embodiment of the second battery according to the present invention (example of fixing an active material layer to both surfaces of both the positive electrode and the negative electrode), in which (a) shows an inner circumferential portion and (b) shows an outer circumferential portion thereof.
Figure 7B:
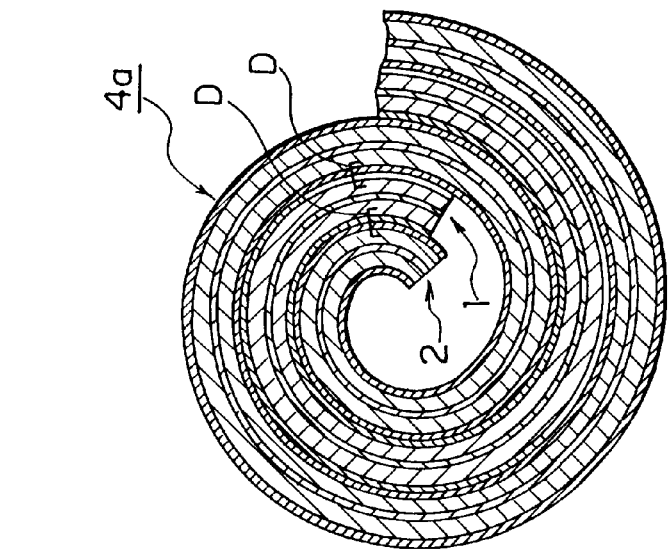

Further, in this embodiment, the aggregation layer of insulating material particles 3B constituting the separator is formed on the entire surface of the negative electrode active material layer 2b but is not formed on the positive electrode active material layer 1b, but as shown in FIG. 7, aggregation layer of insulating material particles 3A and 3B may be formed for the entire surface of both the positive and negative active material layers 1b and 2b. In such a constitution, separators comprising two layers of the aggregation layer of insulating material particles 3A and 3B exist between the positive and negative active material layers 1b and 2b in each cell layer D. If the two layers of separators exist, the function of the separator is not deteriorated even when defects such as pin holes are formed for instance in any of the aggregation layer of insulating material particles.

Further, as shown in FIG. 8, the negative electrode active material layer 2b may not be previously formed (current collector exposed portion R is formed) to the current collector 2a at a portion not constituting the cell layer D (for the length d at the outermost circumferential portion and the length c at the innermost circumferential portion of the electrode plate laminate). In such a constitution, since the winding length can be increased when an electrode plate laminate for the identical battery can is manufactured, the capacity can be increased by so much.

Figure 9:
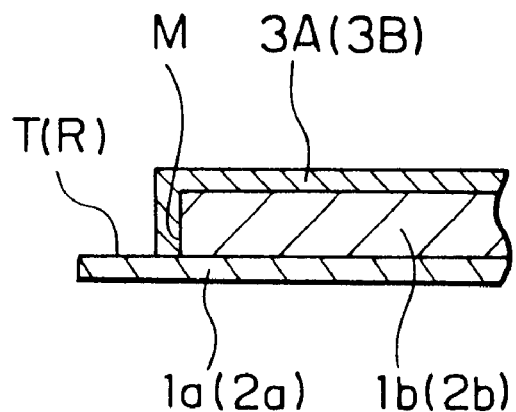
FIG. 9 is a cross sectional view showing an example of a method of fixing a separator to an active material layer.
Figure 10:
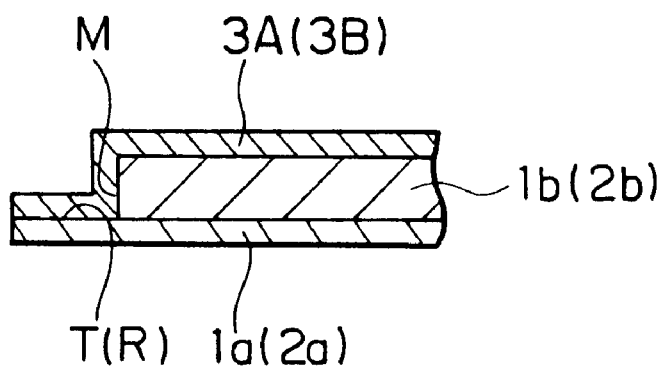
FIG. 10 is a cross sectional view showing an example of a method of fixing a separator to an active material layer.
Figure 11:
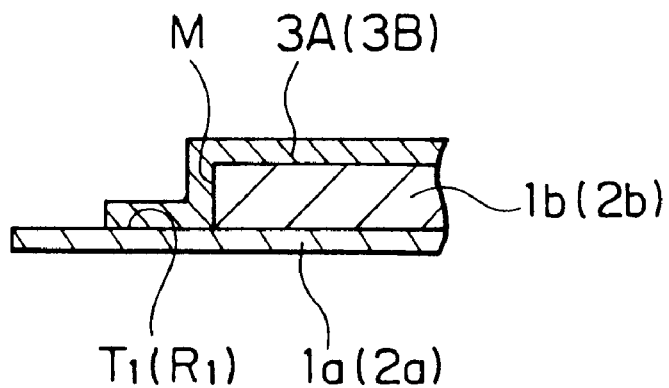
FIG. 11 is a cross sectional view showing an example of a method of fixing a separator to an active material layer.

Further, in the electrode plate laminate shown in the drawing, a current collector exposed portion T for fixing a tab is also formed. If the current collector exposed portion T and/or the current collector exposed portion R described above exist, the aggregation layer of insulating material particles 3A (3B) may be formed so as to cover the end face M of the active material layer 1b (2b) as shown in FIG. 9. Further, the aggregation layer of insulating material particles 3A (3B) may be formed so as to entirely cover the end face M of the active material layer 1b (2b) and the current collector exposed portion T (R) as shown in FIG. 10. Furthermore, the aggregation layer of insulating material particles 3A (3B) may also be formed so as to cover the end face M of the active material layer 1b (2b) and a portion T (R1) of the current collector exposed portion T1 (R1) as shown in FIG. 11.

The aggregation layer of insulating material particles may be fixed to the current collector exposed portion as described above. Alternatively, an insulation film is cut out and stuck or inserted so as not to overhang the electrode, thereby enabling to prevent short circuit.

Figure 12:
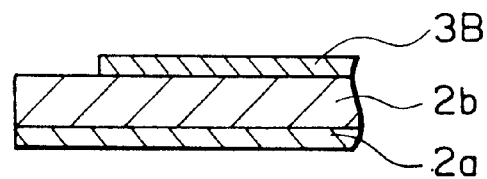
FIG. 12 is a cross sectional view showing an example of a method of fixing a separator to a negative electrode active material layer.
Figure 13:
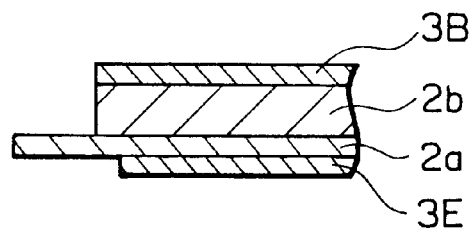
FIG. 13 is a cross sectional view showing an example of a method of fixing a separator to a negative electrode active current collector.

Further, when the separator 3B is fixed to the surface of the negative electrode active material layer 2b, it is not necessarily fixed to the entire surface of the layer but it may be fixed, as shown in FIG. 12, by a size identical with the positive electrode active material layer opposed thereto or a size extending beyond the outer periphery of the same. In the same manner, when the aggregation layer of insulating material particles 3E is fixed to the surface of the negative electrode current collector 2a, it is not necessarily fixed to the entire surface of the layer but it may be fixed, as shown in FIG. 13, by such a size as identical with the positive electrode current collector opposed thereto or a size extending beyond the outer periphery of the same.

Further, although the separator comprising the aggregation layer of insulating material particles may be formed only on the entire surface of the positive electrode 1 and not formed to the negative electrode 2, it is preferred that the separator is formed to the surface of the negative electrode 2 in view of chipping down at the cut portion.

When an electrode plate laminate is manufactured as in the method of the embodiment described above, by the use of the negative electrode 2 prepared by forming the separator 3B comprising the aggregation layer of insulating material particles on both surfaces of the wide member 20 of the negative electrode and cutting that and the positive electrode 1 not formed with the separator comprising the aggregation layer of insulating material particles, an electrode plate laminate with the size of the positive electrode 1 being smaller than that of the negative electrode 2 paired therewith as the cell layer can be obtained easily and efficiently.

Figure 14:
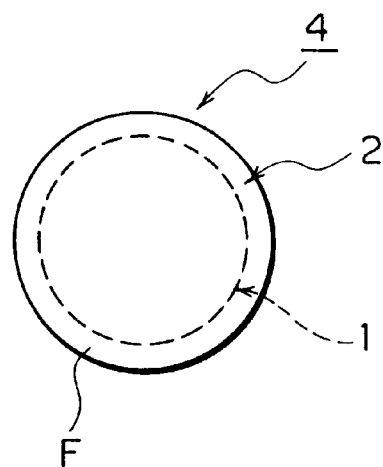
FIG. 14 is a plan view showing an electrode plate laminate of a coin-shaped simple lamination type battery.
Figure 15:
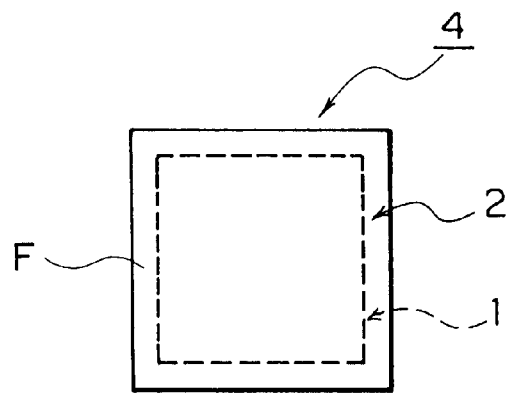
FIG. 15 shows an electrode plate laminate of a square simple lamination type battery.
Figure 16:
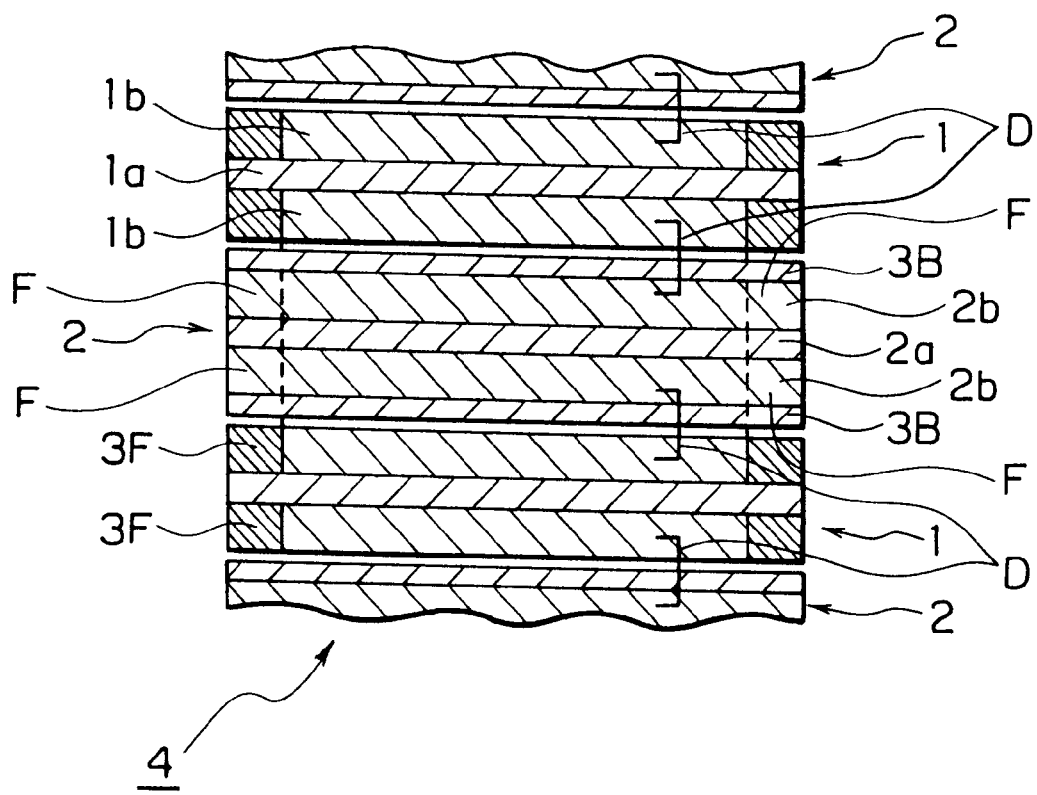
FIG. 16 and FIG. 17 are cross sectional views showing examples of cross sectional structures of electrode plate laminates in FIG. 14 and FIG. 15 respectively.

The embodiment described above shows a wound type battery, but same effects can be obtained also by a zigzag-folded type or a simple lamination type battery. FIG. 14 shows an electrode plate laminate for a coin shaped simple lamination type battery and FIG. 15 shows an electrode plate laminate for a square simple lamination type battery. Further, FIG. 16 is a cross sectional view of the electrode plate laminates.

In this embodiment, for instance, after cutting out a negative electrode 2 of a circular or square shape and cutting out a positive electrode 1 to a size slightly smaller than that from positive and negative wide members 10 and 20 formed in the same manner as described above, the negative electrode 2 and the positive electrode 1 are stacked alternately with their centers being aligned.

With such a constitution, since the sole portion F for the negative electrode active material layer is present at an entire edge for a portion of the electrode plate laminate 4 that forms the cell layer D, the short-circuit preventive effect described above can be obtained. Further, since the separator is formed to the identical size with that of the negative electrode 2 by the aggregation layer of insulating material particles 3B fixed to the negative electrode active material layer 2b, the positive electrode can be enlarged to increase the battery capacity in the same manner as described above.

In the embodiment described above, the sole portion F of the negative electrode active material layer is disposed to a portion of the electrode plate laminate that forms the cell layer D, but the invention is not restricted only to this constitution. Namely, in a case that short circuit causes no substantial problem, the area of the positive electrode active material layer that forms the cell layer D of the electrode plate laminate may be made identical with the negative electrode active material layer and the aggregation layer of insulating material particles, thereby enabling to increase the battery capacity further for an identical battery can.

Figure 17:
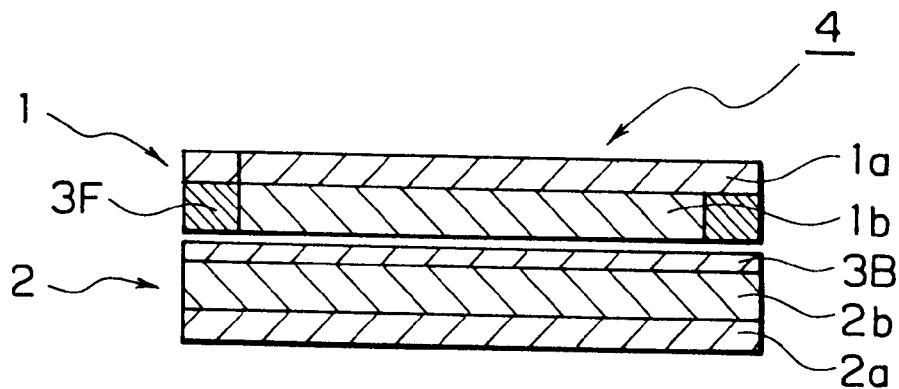

Further, in the electrode plate laminate of the simple lamination type battery shown in FIG. 16, plural cell layers D are formed by stacking plural positive electrodes and plural negative electrodes fixed with a separator, but a positive electrode 1 and a negative electrode 2 each fixed with the separator (aggregation layer of insulating material particles 3B) may be stacked each by one as shown in FIG. 17.

Second Embodiment

Then, a second embodiment of a battery according to the present invention is to be explained. This embodiment corresponds to an embodiment according to a third battery of the present invention.

Figure 18:
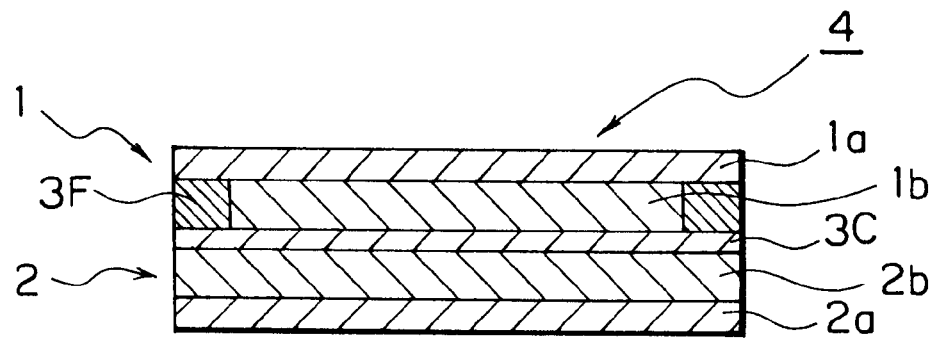
FIG. 18 and FIG. 19 are cross sectional views showing embodiments of a third battery according to the present invention.

The electrode plate laminate for the third battery according to the present invention can include, for example, an electrode plate laminate 4 shown in FIG. 18. The electrode plate laminate 4 comprises a positive electrode 1 having a material containing lithium-containing composite oxide as a positive electrode active material layer 1b coated on one surface of a positive electrode current collector 1a made of an aluminum foil, a negative electrode 2 having a material containing carbon particles as a negative electrode active material layer 2b coated on one surface a current collector foil 2a made of copper, and a separator (aggregation layer of insulating material particles) 3C interposed between the positive electrode active material layer 1b and the negative electrode active material layer 2b, in which the separator 3C is fixed to both surfaces of the positive electrode active material layer 1b and the negative electrode active material layer 2b. That is, the electrode plate laminate 4 has only one integrated layer formed by integrating the separator comprising the aggregation layer of insulating material particles and both of the electrodes.

EXAMPLE 7

COMPARATIVE EXAMPLES 3–4

At first, the following members were prepared as the electrodes for a sheet-type battery.

For a positive electrode, a square electrode sheet of 4.0 cm×4.0 cm was cut out of a positive electrode wide member prepared in the same manner as in Examples 1 to 6.

For a negative electrode, there were prepared needle coke as a negative electrode active material, carboxymethyl cellulose as a dispersant and a latex as a binder.

They were mixed at a ratio of needle coke:carboxymethylol cellulose:latex=100:0.8:2.0 by weight to form a slurry. After coating the slurry on one surface of a copper foil (negative electrode current collector) 2a of 18 $\mu$m thickness, it was dried and pressed to form a negative electrode wide member having a negative electrode active material layer 2b of 124 $\mu$m thickness. A square electrode sheet of 4.1 cm×4.1 cm was cut out of the negative electrode wide member.

Then, an aggregation layer of insulating material particles (separator) was formed and an electrode plate laminate was manufactured as below.

As insulating material particles, $\alpha$-$Al_2O_3$ (average grain size for 50%: 1.0 $\mu$m) was prepared. Further, a powder of polyvinylidene fluoride (PVDF) (KF#1100, manufactured by Kureha Chemical Industry Co.) as a binder and N-methylpyrrolidone (NMP) as a solvent were prepared. Then, they were mixed in a powdery state as they were as $\alpha$-$Al_2O_3$ PVDF=100:5 (weight ratio), to which NMP was added and further mixed to obtain a slurry of 56.8% content.

The slurry was coated uniformly on the positive electrode active material layer 1b of the positive electrode cut out as described above and on the negative electrode active material layer 2b of the negative electrode cut out as described above by using a doctor blade, which were immediately stuck with layers 1b and 2b being opposed to each other, and dried in a drying furnace at 130° C. for 30 min. to prepare an electrode plate laminate. The thickness of the aggregation layer of insulating material particles 3C was 20 $\mu$m.

The electrode plate laminate was contained together with an electrolyte solution containing $LiBF_4$ dissolved by 1.5 mol/l in a mixed solvent of ethylene carbonate (propylene carbonate (PC), ethylene carbonate (EC), γ-butyrolactone (γ-BL) at a volume ratio of 1:1:2 into an aluminum foil laminate sheet package and sealed, to manufacture a sheet-type battery.

A charging/discharging test for the sheet-type battery was conducted in a thermostable bath at 20° C. under the following conditions.

Charging:

First cycle:

Charging at constant current and constant voltage for 6 hours in total with an upper limit voltage of 4.2 V and a current density of 1.0 mA/cm².

2–100 cycles:

Charging at constant current and constant voltage for 3 hours in total with an upper limit voltage of 4.2 V and a current density of 1.5 mA/cm².

Discharging:

Other than 10th cycle:

Charging at a constant current to a termination voltage of 2.7 V with a current density of 0.6 mA/cm².

Only at 10th cycle:

Charging at constant current to a termination voltage of 2.7 V with a current density of 6.0 mA/cm².

In this test, the discharging capacity change rate between the 9th cycle and the 10th cycle, and a capacity keeping rate for the discharging capacity at the 100th cycle based on the discharging capacity at the first cycle were noted. The discharging capacity change rate is a measure for the rapid discharging characteristics and the capacity keeping rate is the same for the cycle characteristics.

Further, a solid electrolyte was prepared by swelling a copolymer at ratio of a vinylidene fluoride:hexafluoropropylene=92:8 (weight ratio) with the same electrolyte solution as that in the example. The copolymer:electrolyte solution=1:1 weight ratio and the thickness was 100 μm. The solid electrolyte was put between the same positive electrode and the negative electrode as in the example to manufacture an electrode plate laminate in which both of the active material layers were opposed. The electrode plate laminate was sealed in the same package as in the example to manufacture a sheet-type polymer battery, and applied with charge/discharge under the same conditions as those in the example, which was referred to as Comparative Example 3.

As another comparative example, a microporous film separator made of polyethylene of 25 μm thickness used in conventional lithium ion secondary batteries was put between the same positive electrode and the negative electrode as those in the example to manufacture an electrode plate laminate, in which both of the active material layers were opposed to each other. The electrode plate laminate was sealed in the identical package with that of the example to manufacture a sheet-type battery and applied with charge/discharge under the same conditions as those in the example, which was referred to as Comparative Example 4.

The results of the foregoings are shown in Table 3.

TABLE 3

|  | $9^{th} \to 10^{th}$ cycle Discharge capacity change rate (%) | 100th cycle Capacity keeping rate (%) |
| --- | --- | --- |
| Example 7 | −38.3 | 94 |
| Comparative Example 3 | −77.5 | 91 |
| Comparative Example 4 | −61.6 | 79 |

As can be seen from Table 3, the third battery of the present invention is more excellent, particularly, in view of the rapid discharging characteristics compared with the polymer battery. Further, it is also excellent both in the rapid discharging characteristics and the cycle characteristics compared with a sheet type battery using a microporous film separator made of polyethylene of 25 μm thickness used in conventional lithium ion secondary batteries.

Figure 19:
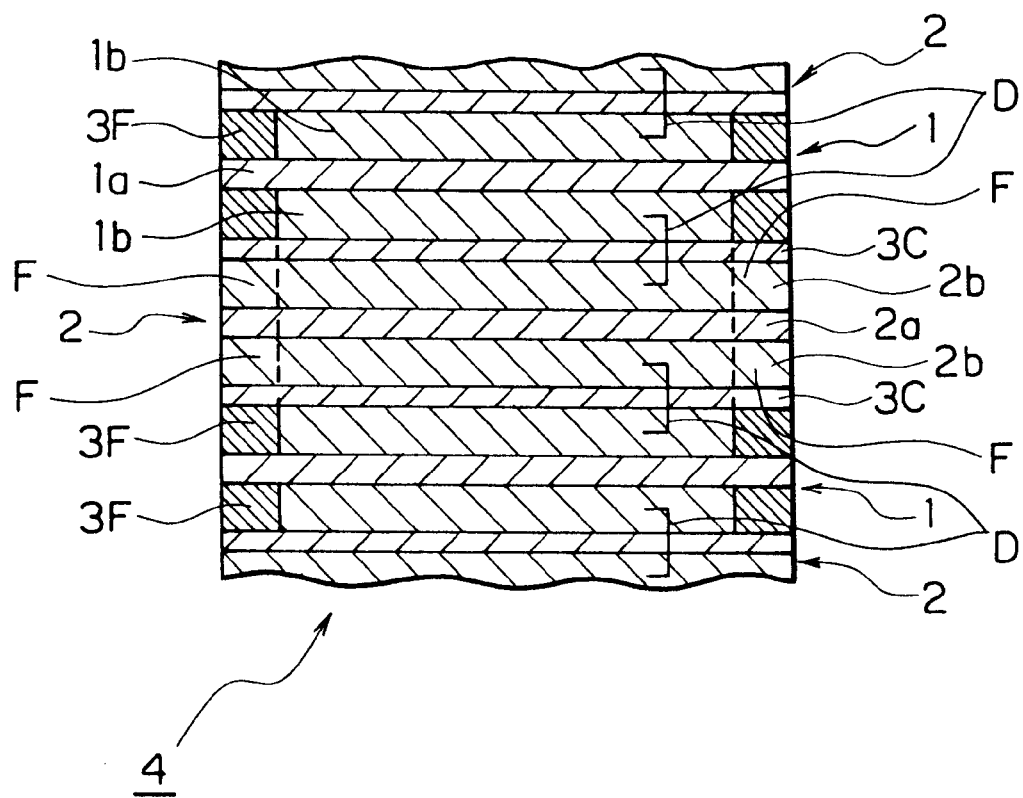
Figure 20:
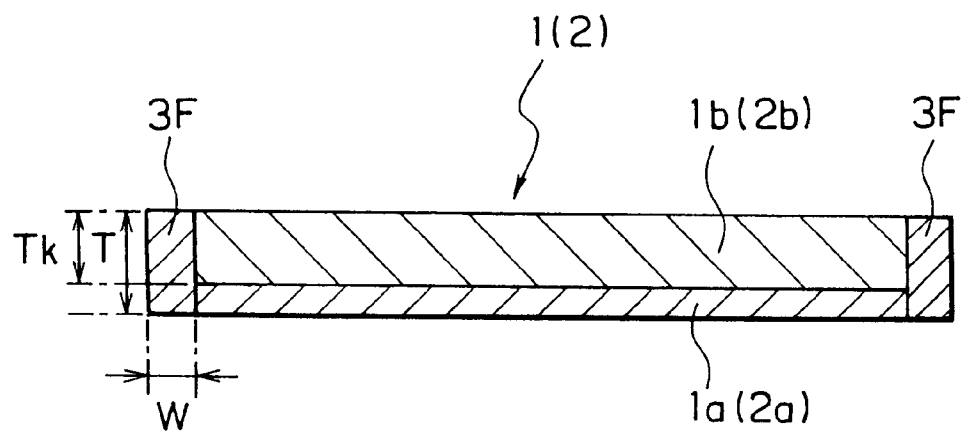
FIG. 20 is a cross sectional view showing an embodiment of an electrode constituting a first battery according to the present invention.

The electrode plate laminate of the embodiment described above has only one integrated layer formed by integrating the positive electrode, the separator and the negative electrode, but the integrated layer may be laminated by two or more layers as shown in FIG. 19.

In the electrode plate laminate 4 shown in FIG. 19, since the integrated layers are laminated by two or more layers, a plurality of cell layers D are formed and, since the sole portion F of the negative electrode active material layer is present over the entire edge for the portion constituting the cell layer D, the sheet-type battery having the electrode plate laminate 4 shown in FIG. 19 can also provide the short circuit preventive effect as explained for the second embodiment described above. Furthermore, since the separator has an identical size with the negative electrode 2 by the aggregation layer of insulating material particles 3D fixed to the positive and negative electrode active materials 2b and 1b, the positive electrode 1 can be enlarged to increase the battery capacity.

Third Embodiment

A third embodiment of the battery according to the present invention is to be explained. This embodiment corresponds to the embodiment of the first battery according to the present invention.

EXAMPLE 8

COMPARATIVE EXAMPLE 5

At first, in the same manner as in Examples 1–6, a positive electrode wide member and a negative electrode wide member were prepared, and aggregation layer of insulating material particles 3A and 3B were formed respectively to the entire surface of the active material layers of the wide members.

Figure 22A:
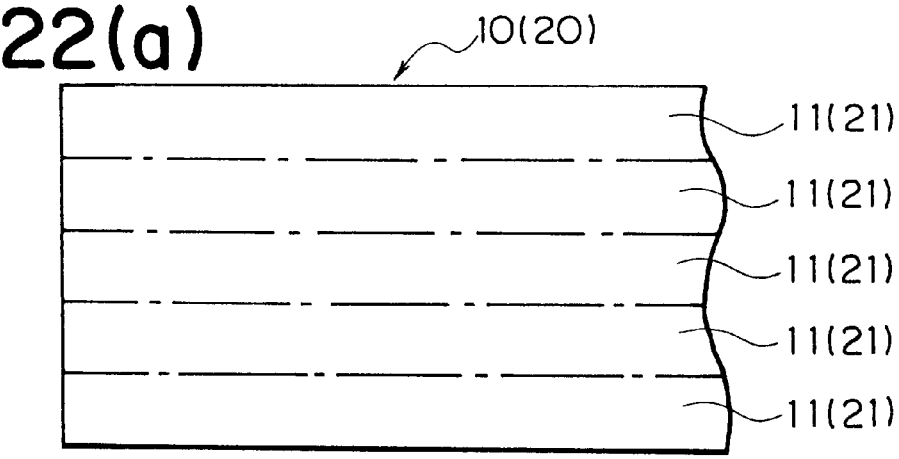
FIG. 22 is a step chart showing procedures of manufacturing an electrode plate laminate in Example 8, in which (a) shows a manufacturing step for a wide member, (b) shows a strip member obtained by the step (a), (c) shows a step of forming coating with an insulating material and (d) shows a step of manufacturing an electrode plate laminate.
Figure 22B:
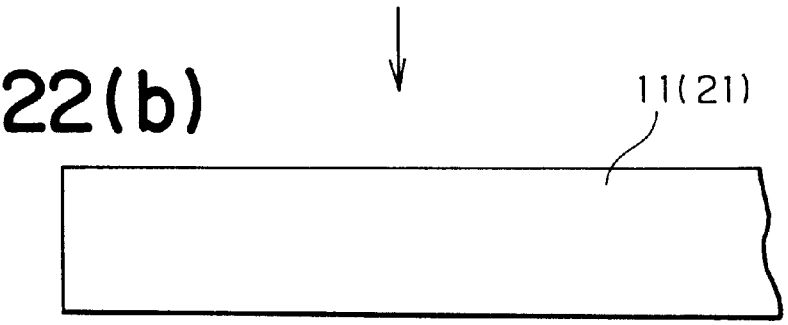

Then, a positive electrode wide member 10 on which an insulating material article aggregation layer 3A was formed and a negative electrode large with member 20 on which an insulating material article aggregation layer 3B was formed were cut in a lateral direction as shown in FIG. 22(a), to obtain a positive electrode strip 11 on which the aggregation layer of insulating material particles 3A of 38.75 mm width and 62 cm length was formed and a negative electrode strip 21 on which the aggregation layer of insulating material particles 3B of 40.25 mm width and 59.8 cm length was formed as shown in FIG. 22(b). A coating 3F comprising an aggregation layer of insulating material particles was formed to the lateral end face (cut face) of the strips as shown below.

There were prepared an α-Al$_2$O$_3$ material (average grain size for 50%: 0.7 μm) as insulating material particles, a powder of polyvinylidene fluoride (PVDF) (KF#1100 manufactured by Kureha Chemical Industry Co., Ltd.) as a binder and N-methyl pyrrolidone (NMP) as a solvent. Then, they were mixed in the powdery state as they were at a ratio of α-Al$_2$O$_3$:PVDF=100:5 by weight, to which NMP was added and mixed further to obtain a slurry of 56.8% by weight of solid content.

Figure 1B:
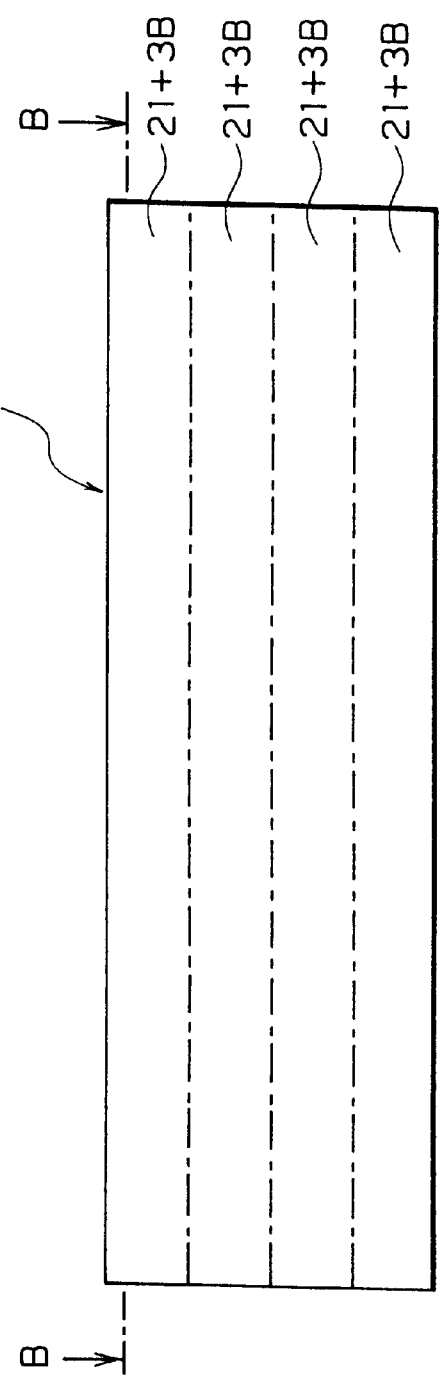
Figure 22C:
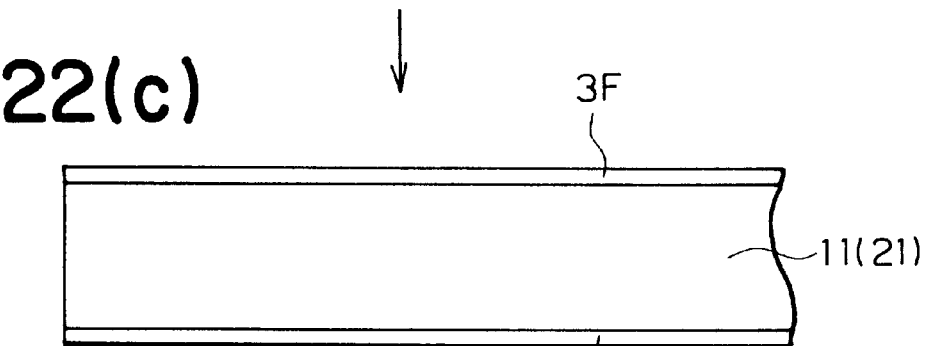

After coating the slurry to the lateral end face of each of the positive and negative strips, they were dried at 120° C. for 2 min. In this way, as shown in FIG. 22(c) and FIG. 1, a coating 3F comprising the aggregation layer of insulating material particles was formed to the entire end face of the active material layers 1b and 2b and the current collector sheets 1a and 2a with a thickness of 10 μm in the lateral direction of the strips so as not to overhang both sides in the direction of the thickness of the positive strips 11 and the negative strips 21 on which the aggregation layer of insulating material particles 3A and 3B were formed.

Figure 22D:
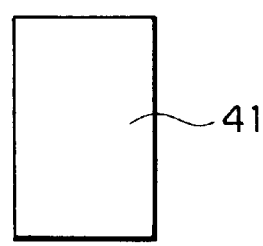

An electrode plate laminate 41 was prepared by using the positive and negative strips and an insulation film 3G made of polypropylene of 12 μm thickness and winding them with the positive electrode being on the outside (FIG. 22(d)).

Figure 25:
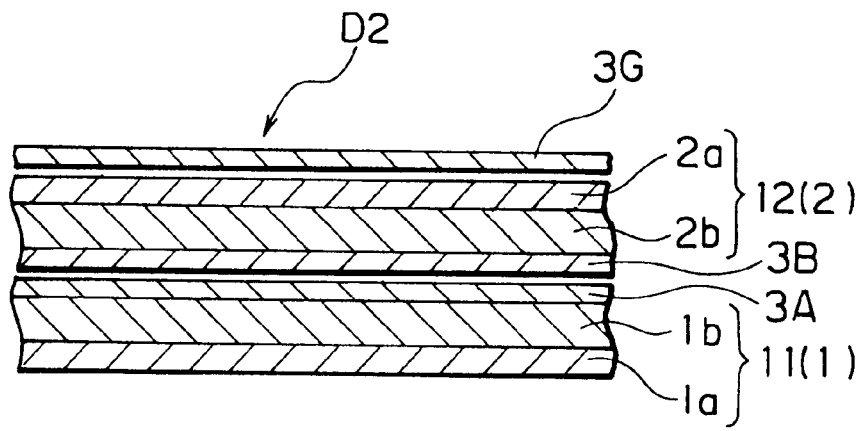
FIG. 25 is a cross sectional view showing a unit cell layer of an electrode plate laminate manufactured in Example 9.

That is, the unit cell layer D1 of the electrode plate laminate 41 comprises, as shown in FIG. 25, a positive electrode 1 having a positive electrode active material layer 1b fixed on one surface of an aluminum foil 1a (positive electrode strip 11), a negative electrode 2 having a negative electrode active material layer 2b fixed on one surface of a copper foil 2a (negative electrode strip 21), aggregation layer of insulating material particles 3A and 3B fixed on the respective active material layers, and an insulation film 3G interposed between the both of the positive and negative current collectors 1a and 2a.

The electrode plate laminate 41 is contained together with an electrolyte solution comprising 1.0 mol/l of LiPF$_6$ dissolved in a solvent mixture of ethylene carbonate (EC) and diethyl carbonate (DEC) at 1:1 volume ratio into a battery can of 17 mm diameter and 5 cm height and sealed to manufacture a cylindrical lithium ion secondary battery.

Further, as Comparative Example 5, a lithium ion secondary battery was manufactured quite in the same manner as in Example 8 except for not forming the coating 3F comprising the aggregation layer of insulating material particles on the lateral end face of both the positive strips 11 and the negative strips 21.

The batteries were prepared each by 100 units, charge/discharge was conducted for one cycle under the following conditions in a thermostable bath at 20° C. and the number of batteries causing short circuit abnormality was examined.
Charging:
Charging at constant current and constant voltage for 5 hours in total with an upper limit voltage of 4.2 V and a current density of 0.5 mA/cm$^2$.
Discharging:
Discharging at a constant current, with a current density of 0.5 mA/cm$^2$ and a termination voltage of 2.7 V.

As a result, short circuit abnormality was occurred in none of 100 units in Example 8, whereas short circuit abnormality occurred for three of 100 units in Comparative Example 1. Namely, it can be seen that the rate of occurrence of short circuit abnormality is greatly reduced by forming the coating 3F comprising the aggregation layer of insulating material particles to the lateral end face of both the positive strips 11 and the negative strips 21.

EXAMPLE 9

COMPARATIVE EXAMPLE 6

At first, in the same manner as in Example 8, a positive electrode wide member and a negative electrode wide member were prepared. Then, in the same manner as in Example 8, a slurry comprising insulating material particles, a binder and a solvent was obtained.

The slurry was coated uniformly on the positive electrode active material layer 1b of the positive electrode wide member and the negative electrode active material layer 2b of the negative electrode wide member by using a die coater, which was dried in a drying furnace at 120° C. for 2 min., thereby fixing a separator 3A on the positive electrode active material layer 1b and a separator 3B on the negative electrode active material layer 2b, each separator comprising the aggregation layer of insulating material particles of 12 μm thickness.

Figure 24A:
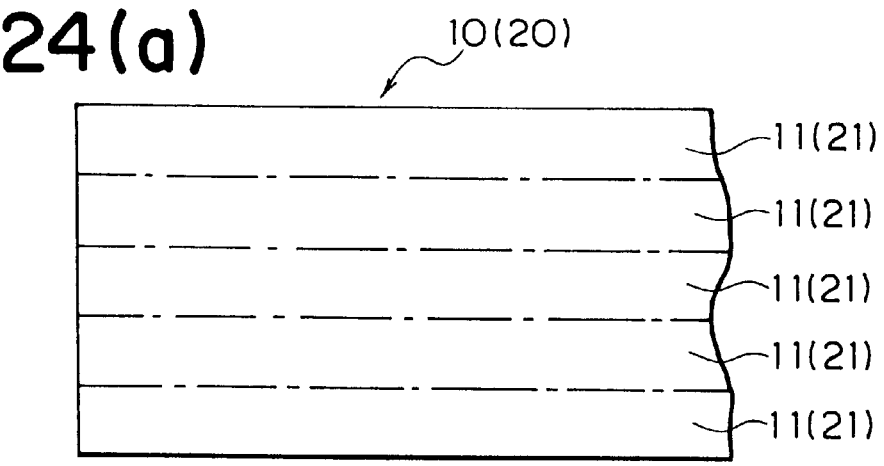
FIG. 24 is a step chart showing procedures of manufacturing an electrode plate laminate in Example 9, in which (a) shows a manufacturing step for a wide member, (b) shows a strip member obtained by the step (a), (c) shows a step of manufacturing an electrode plate laminate
FIG. 24(d) shows a step of forming coating with an insulating material.
Figure 24B:
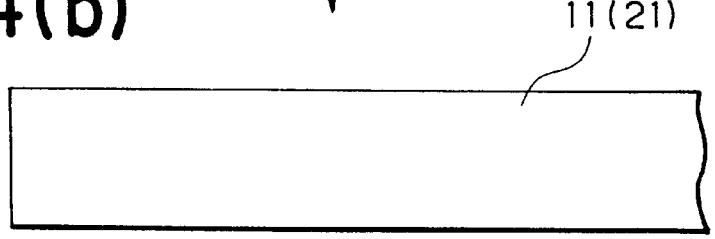

Further, as shown in FIG. 24(a), the thus manufactured positive electrode wide member 10 and the negative electrode wide member 20 were cut in the lateral direction, to obtain a positive electrode strip 11 of 38.75 mm width and 62 cm length and a negative electrode strip 21 of 40.25 mm width and 59.8 cm length as shown in FIG. 24(b).

Figure 24C:
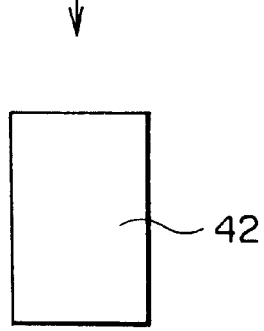
Figure 24D:
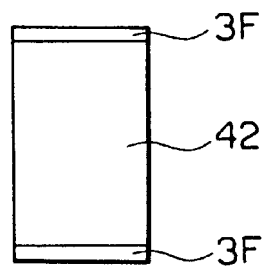

A cylindrical electrode plate laminate 42 was manufactured by using the positive strips 11, the negative strips 21 and an insulation film 3G made of polypropylene of 12 μm thickness and winding them with the positive electrode being at the outside (FIG. 24(c)).

That is, the unit cell layer D2 of the electrode plate laminate 42 comprises, as shown in FIG. 25, a positive electrode 1 having a positive electrode active material layer 1b fixed on one surface of an aluminum foil 1a, a negative electrode 2 having a negative electrode active material layer 2b fixed on one surface of a copper foil 2a, a separator 3A comprising an aggregation layer of insulating material particles fixed on the positive electrode active material layer 1b, a separator 3B comprising an aggregation layer of insulating material particles fixed on the negative electrode active material layer 2b, and an insulation film 3G. Then, the positive electrode strip 11 comprises the positive electrode 1 and the separator 13A on the side of the positive electrode, while the negative electrode strip 21 comprises the negative electrode 2 and the separator 13B on the side of the negative electrode.

A coating 3F comprising an aggregation layer of insulating material particles was formed to both end faces of the electrode plate laminate 42 (both bottom faces of the cylinder) as described below.

Figure 26:
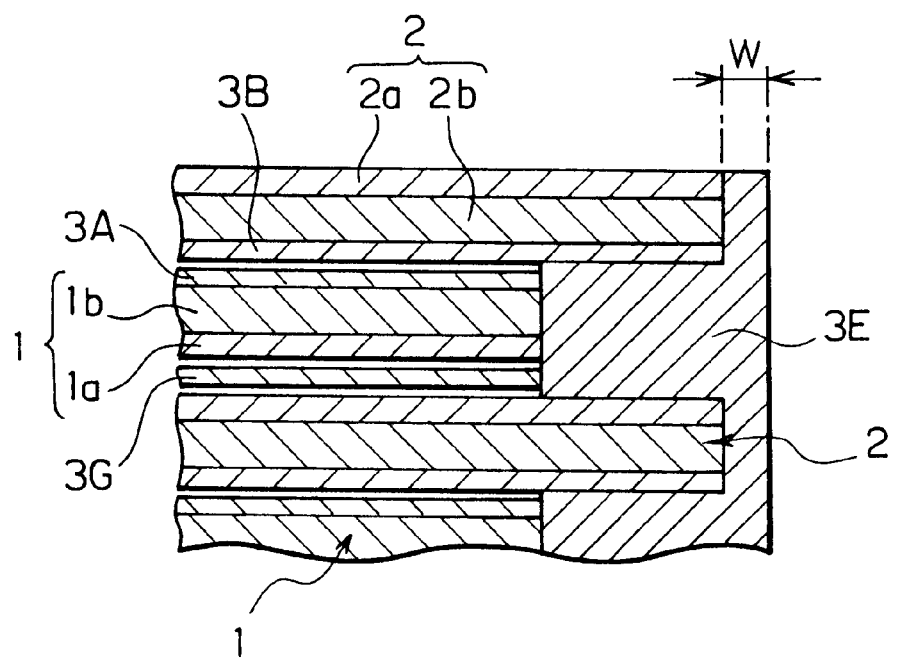
FIG. 26 is as enlarged fragmentary cross sectional view showing the vicinity of an end face of an electrode plate laminate manufactured in Example 9.

That is, after coating the same slurry as used for manufacturing the separators 3A and 3B on both end faces of the electrode plate laminate 42, it was dried at 120° C. for 2 min. to form a coating 3F in which a large number of α-Al$_2$O$_3$ particles were bonded with each other by PVDF as shown in FIG. 23(d). In this embodiment, the coating 3F was fixed, for example, as shown in FIG. 26, to all of the end faces of the positive electrode strip 11, the negative electrode strip 21 and the insulation film 3G such that the width W at the end face of the negative electrode strip 21 was 10 μm, and it was formed also to the end of the upper surface of the negative electrode active material layer 2b.

The electrode plate laminate 42 having the coating 3F comprising the aggregation layer of insulating material particles formed on both end faces was contained together with the electrolyte solution of the same composition as in Example 8 in a battery can of 17 mm diameter and 5 cm height and sealed to manufacture a lithium ion secondary battery.

Further, as Comparative Example 6, a lithium ion secondary battery was assembled quite in the same manner as in Example 9 except for not fixing the coating 3F comprising the aggregation layer of insulating material particles on both end faces of the electrode plate laminate 42.

Batteries were prepared by 100 units for each of them and charge/discharge was conducted for 1 cycle under the same conditions as those in Example 1, to examine the number of batteries causing short circuit abnormality.

As a result, short circuit abnormality occurred to only one of 100 units in Example 9, whereas short circuit abnormality occurred to five of 100 units in Comparative Example 2. That is, it can be seen that the rate of occurrence of short circuit abnormality is greatly reduced by forming the coating 3F comprising the insulative material particle aggregation layer on both end faces of the electrode plate laminate 42.

Figure 28:
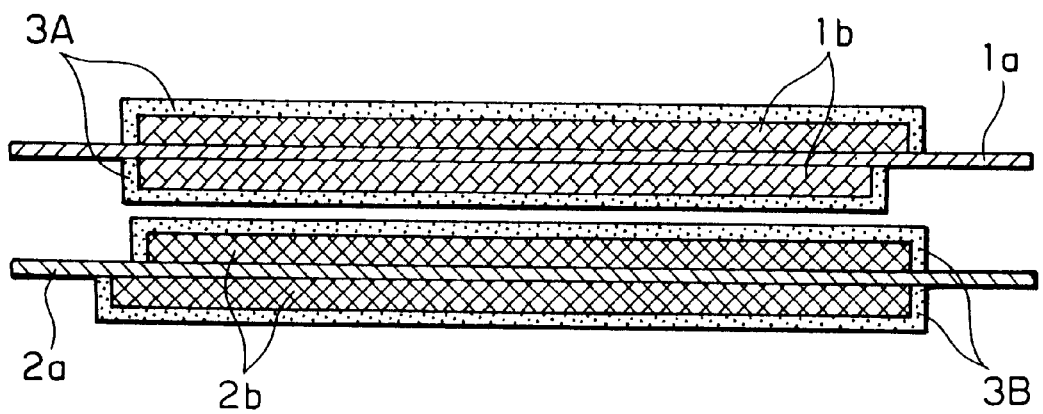
FIG. 28 and FIG. 29 concern an embodiment of the first battery according to the present invention, which are cross sectional views showing examples for a positive electrode strip member and a negative electrode strip member of a wound type electrode plate laminate.

FIG. 28 shows an example of a positive electrode strip and a negative electrode strip of a wound type electrode plate laminate. In this example, active material layers 1b and 2b are formed to portions on both surfaces of current collectors 1a and 2a except for longitudinal ends both for the positive electrode strip 11 and the negative electrode strip 21, and aggregation layer of insulating material particles 3A and 3B are fixed over the entire surfaces and the entire end faces in the longitudinal direction and the lateral direction of both the active material layers. The thickness of the aggregation layer of insulating material particles 3A and 3B is identical between the portion constituting the separator and the end face coating portion. Thus, entire end faces of both the active material layers are coated with the aggregation layer of insulating material particles.

Figure 29:
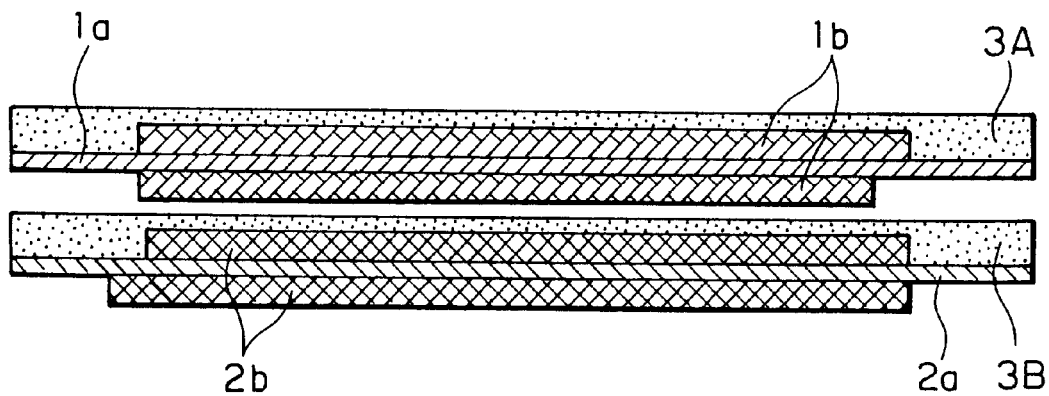

On the contrary, FIG. 29 shows an embodiment in which active material layers 1b and 2b are formed on both surfaces of the current collectors 1a and 2a excepting for the longitudinal ends, and aggregation layer of insulating material particles 3A and 3B are formed only on one surface of the active material layers. When the aggregation layer of insulating material particles 3A and 3B are formed in this way only on one surface of the active material layers, the aggregation layer of insulating material particles 3A and 3B may be fixed to the entire surface of one surface of the current collectors 1a and 2a.

In the embodiment described above, while explanations have been made to a battery having a wound type electrode plate laminate formed by cutting the positive electrode, the negative electrode and the separator each into a strip-like shape and winding them spirally by a winding machine, the present invention is not restricted thereto but is applicable also to batteries having electrode plate laminates of other structures known so far such as a zigzag-folded type of cutting a positive electrode, a negative electrode and a separator each into a strip-like shape and stacking in parallel while folding back them each in a predetermined width and a simple lamination type of cutting a positive electrode, a negative electrode and a separator each into a circular or square shape and stacking them.

FIG. 27 shows an example of a cross sectional view for an electrode plate laminate of a simple lamination type.

Figure 27A:
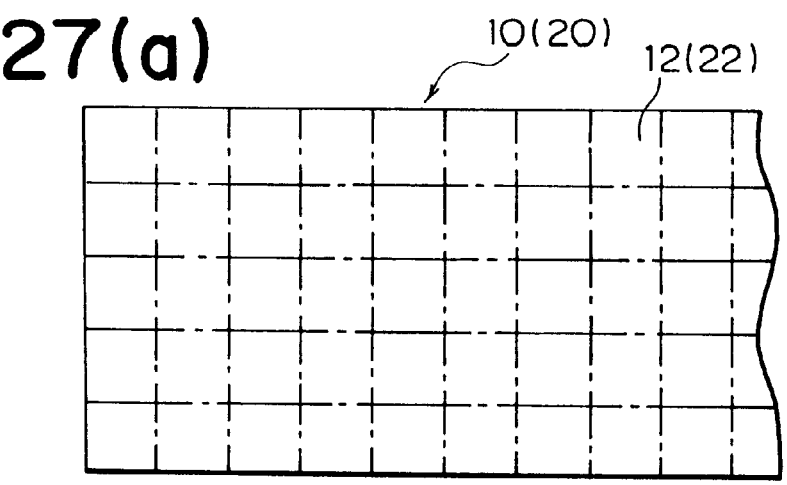
FIG. 27 concerns the first battery according to the present invention, which is a step chart showing manufacturing procedures in a case where the electrode plate laminate is a simple lamination type, in which (a) shows a manufacturing step for a wide member, (b) shows a strip member obtained by the step (a), (c) shows a step of forming coating with an insulating material and (d) shows a step of manufacturing an electrode plate laminate.
Figure 27B:
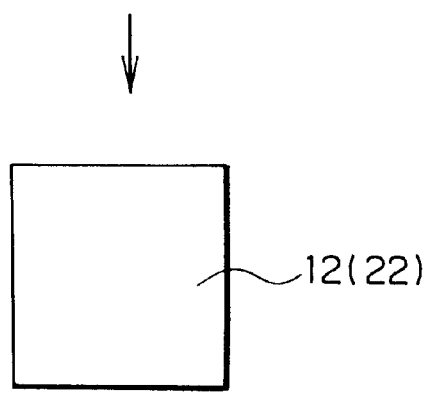
Figure 27C:
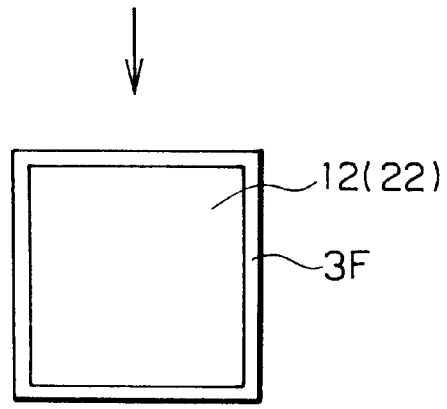
Figure 27D:
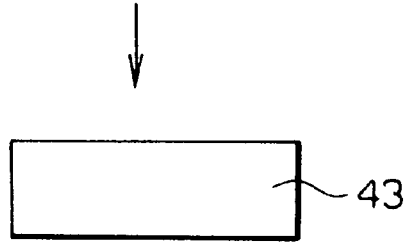

As preparing procedures of this example, each of positive and negative wide members 10 and 20 is cut at first into a lattice pattern as shown in FIG. 27(a) to obtain a square electrode 12, 22 as shown in FIG. 27(b). Then, as shown in FIG. 27(c), a coating 3F comprising an aggregation layer of insulating material particles is formed to all of four end faces of the electrodes 12 and 22. An electrode plate laminate 43 is manufactured by stacking the sheet-like electrodes 12 and 22 alternately for positive and negative electrodes while interposing a separator between each of them (FIG. 27(d)).

Fourth Embodiment

This embodiment corresponds to an embodiment of the second battery and a manufacturing method therefor according to the present invention (second manufacture method of the present invention).

At first, the following members were prepared as the electrode.

For a positive electrode, there were used $LiCoO_2$ as a positive electrode active material, flaky graphite and acetylene black as a conductive filler and polyvinylidene fluoride (PVDF) as a binder. They were mixed in N-methyl pyrrolidone (NMP) at a ratio of $LiCoO_2$:flaky graphite:acetylene black:polyvinylidene fluoride=100:4.0:2.5 4.0, by weight, to obtain a slurry.

The slurry was coated on one surface of an aluminum foil (positive electrode current collector) 1a of 20 μm thickness such that coating areas and non-coating areas exist alternately in the coating direction and a direction perpendicular thereto and such that the width is identical between each of the coating areas and between each of the not-coating areas in each of the direction. However, it is not always necessary that the non-coated areas exist in the coating direction. The slurry was dried and applied with pressing to form a positive electrode wide member 10 having a positive electrode active material layer 1b of 87 μm thickness.

Figure 30:
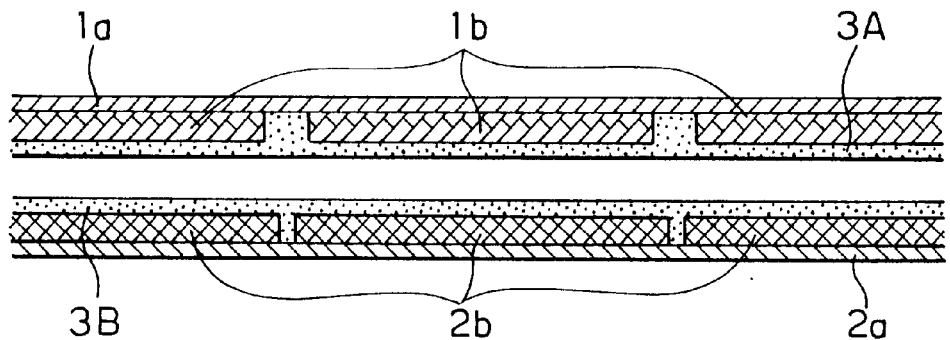
FIG. 30 and FIG. 31 concerns an embodiment of a second manufacturing method according to the present invention, which are cross sectional views showing manufactured positive electrode member and negative electrode member.

In the positive electrode wide member (positive electrode member) 10, as shown in FIG. 30, a positive electrode active material layers 1b were formed in parallel each at a width narrower than the width of the current collector set for the electrode plate laminate and being spaced apart by a predetermined gap.

For a negative electrode, there were used mesophase pitch carbon fiber graphite and flaky graphite as a negative electrode active material, carboxymethyl cellulose as a dispersant and a latex as a binder. They were mixed in purified water at a ratio of mesophase pitch carbon fiber graphite:flaky graphite:carboxymethyl cellulose:latex=90:10:1.4:1.8 by weight, to obtain a slurry.

The slurry was coated on one surface of a copper foil (negative electrode current collector) 2a of 12 μm thickness in the same manner as that for the positive electrode described above but with a larger coating width than that for the positive electrode in each of the directions. The slurry was dried and applied with pressing to form a negative electrode wide member 20 having a negative electrode active material layer 2b of 81 μm thickness.

In the negative electrode wide member (negative electrode member) 20, as shown in FIG. 30, negative electrode active material layers 2b were formed in parallel each at a width narrower than the width of the current collector set for the electrode plate laminate and being spaced apart by a predetermined gap.

After coating a slurry containing the same insulating material particles as those in the example described above over the entire surface of the positive electrode wide member 10 and the negative electrode wide member 20 on the sides each formed with the active material layer, it was dried. Thus, the aggregation layer of insulating material particles 3A and 3B were thus fixed over the entire surfaces and over the entire end faces of the positive and the negative active material layers. The thickness of the insulating material particles aggregation layer formed on the surfaces of both of the active material layers (that is, the thickness of the separator fixed to each of the electrodes) was 12 µm.

The positive electrode wide member and the negative electrode wide member were cut in perpendicular to the plane of the sheet at each of gap positions, to obtain a positive electrode 1 and a negative electrode 2 of the same size to which the aggregation layer of insulating material particles 3A and 3B were fixed. An electrode plate laminate 4 of the battery corresponding to the second battery according to the present invention was obtained by stacking the positive electrode 1 and the negative electrode 2 on which the aggregation layer of insulating material particles 3A and 3B were fixed while opposing the aggregation layer of insulating material particles 3A and 3B to each other as shown in FIG. 33.

Figure 31:
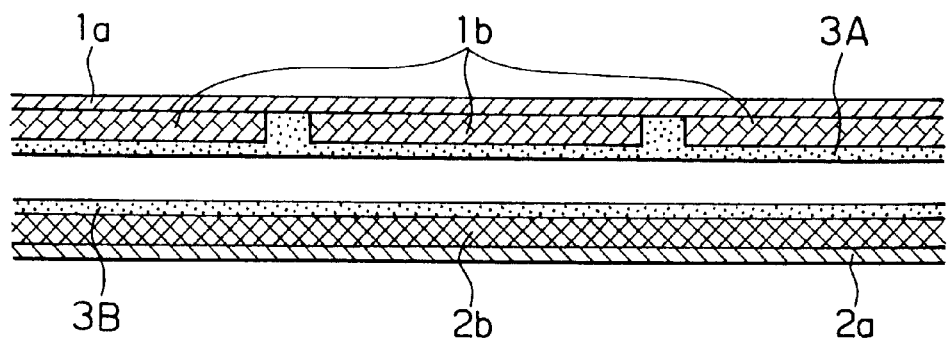
Figure 33:
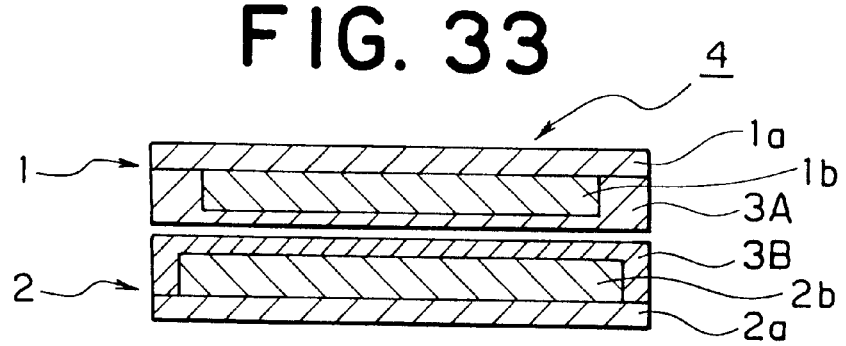
FIG. 33 and FIG. 34 concern an embodiment of the second battery according to the present invention, which are cross sectional views showing examples of electrode plate laminates.
Figure 34:
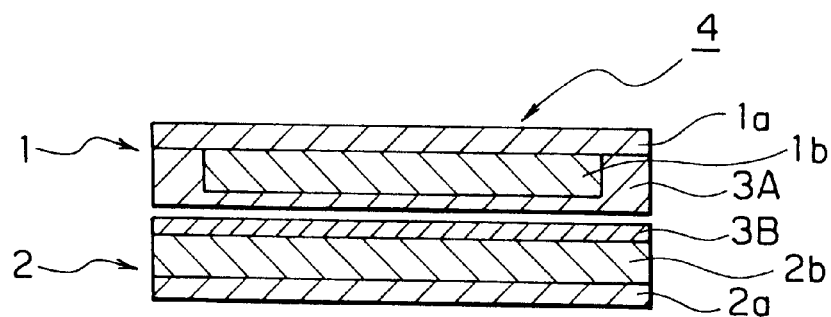

FIG. 34 is a cross sectional view showing another electrode plate laminate of a battery corresponding to the second battery according to the present invention. In the positive electrode laminate 4, as a positive electrode wide member 10, the member formed in the same manner as in FIG. 33 is used, while as a negative electrode wide member 20, the member which a negative electrode active material layer 2b formed entirely on one surface of the negative electrode current collector 2a as shown in FIG. 31 is used. Then, the negative electrode 2 having the aggregation layer of insulating material particles 3B fixed thereon is obtained by cutting the negative electrode wide member 20 having the aggregation layer of insulating material particles 3B fixed thereon in perpendicular to the plane of the sheet by an identical size with the positive electrode 1 having the aggregation layer of insulating material particles 3A fixed thereon. The positive electrode 1 and the negative electrode 2 having the aggregation layer of insulating material particles 3A and 3B fixed thereon are stacked to each other with the aggregation layer of insulating material particles 3A and 3B being opposed to each other, to obtain an electrode plate laminate 4 shown in FIG. 34.

The positive electrode active material layer of the electrode plate laminate 4 in FIGS. 33 and 34 is formed to such a size as not overhanging the negative electrode active material layer paired therewith as the cell layer, and the separator comprising the aggregation layer of insulating material particles is disposed so as to cover at least the entire surface of the positive electrode active material layer opposed to the negative electrode and so as not to overhang the end face of the current collector.

Figure 21:
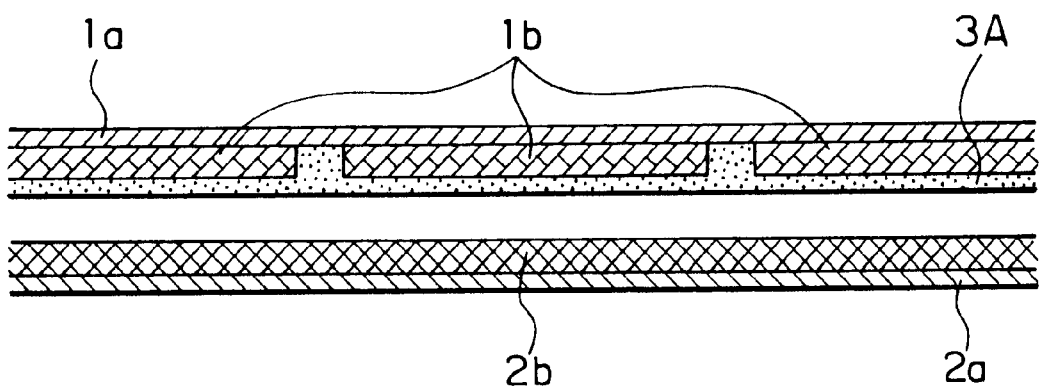
FIG. 21 concerns an embodiment of a second manufacturing method according to the present invention, which is a cross sectional view showing manufactured positive electrode member and negative electrode member.
Figure 23:
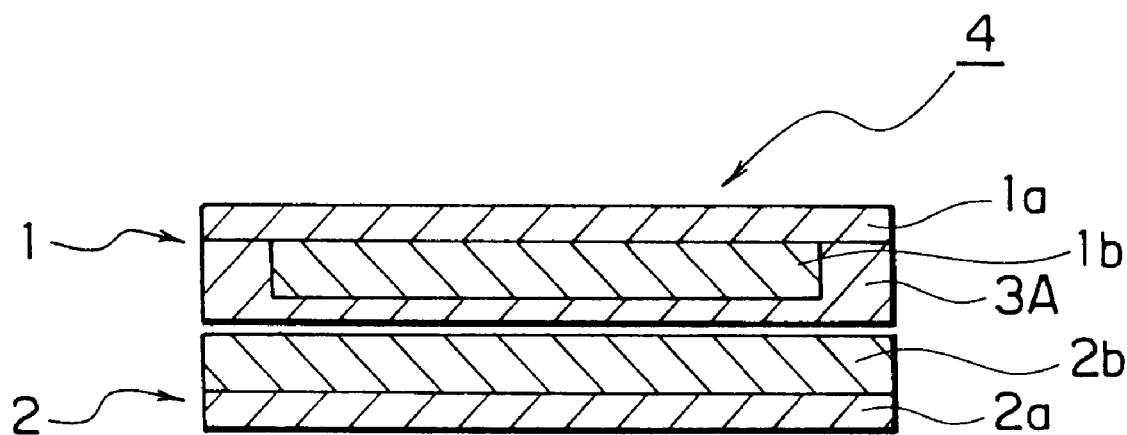
FIG. 23 concerns an embodiment of the second battery according to the present invention and is a cross sectional view showing an example of an electrode plate laminate.

Further, the second battery according to the present invention may also be adapted, as shown in FIGS. 21 and 23, such that the aggregation layer of insulating material particles 3A is formed only one the side of the positive electrode, the end face of the positive electrode active material layer 1b is coated with the aggregation layer of insulating material particles and the aggregation layer of insulating material particles is not formed on the side of the negative electrode.

Fifth Embodiment

This embodiment corresponds to an embodiment of the fourth battery according to the present invention and a manufacturing method thereof (third manufacturing method of the present invention).

Figure 35:
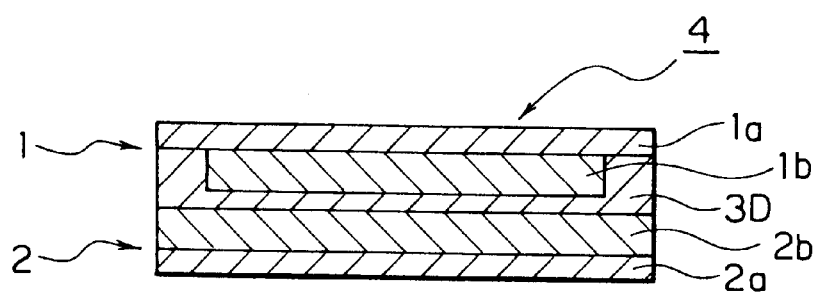
FIG. 35 concerns an embodiment of a fourth battery according to the present invention, which is a cross sectional view showing an example of an electrode plate laminates thereof.

FIG. 35 is a cross sectional view showing an electrode plate laminate of a battery corresponding to the fourth battery according to the present invention. The electrode plate laminate 4 uses, for example, a positive electrode wide member 10 formed in the same manner as that in FIG. 33.

Figure 32:
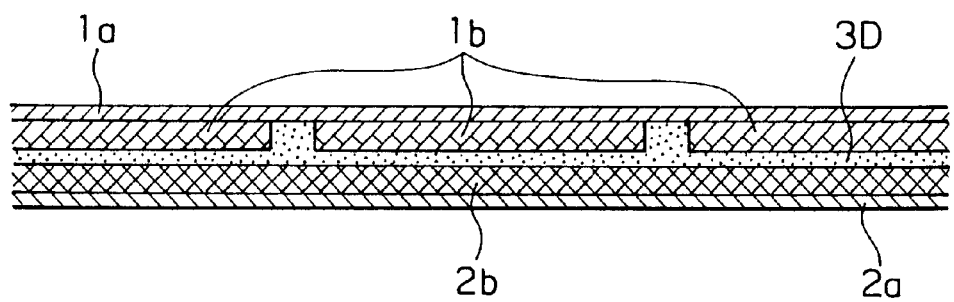
FIG. 32 concerns an embodiment of a third manufacturing method according to the present invention, which is a cross sectional view showing a manufactured integrated layer.

As shown in FIG. 32, after coating a slurry containing the same insulating material particles as in the example described on the entire surface of the positive electrode wide member 10 on the side formed with the active material layer, it was dried. Thus, the aggregation layer of insulating material particles 3C was fixed to the entire surface and the entire end face of the positive electrode active material layer 1b. A slurry for the negative electrode active material layer 2b described above was coated on the entire surface of the aggregation layer of insulating material particles 3C, and the negative electrode current collector 2a described above was stacked, dried and then pressed before drying the slurry, to thereby integrate the negative electrode current collector 2a on the negative electrode active material layer 2b.

Thus, since the positive electrode wide member 10 and the negative electrode wide member 20 are integrated via the aggregation layer of insulating material particles 3C, when the integrated member is cut in perpendicular to the plane of the sheet at positions for the gaps of the positive electrode active material layer 1b, an integrated layer in which the separator and both of the electrodes are integrated is obtained.

An electrode plate laminate 4 shown in FIG. 35 has only one this grated layer in which the positive electrode active material layer is formed to such a size as not overhanging the negative electrode active material layer paired therewith as the cell layer, and the separator comprising the aggregation layer of insulating material particles is disposed so as to cover at least the entire surface of the positive electrode active material layer opposed to the negative electrode, and so as not to overhang the end face of the current collector.

The method of forming the integrated layer can include also a method of integrating the positive electrode wide member 10 having the aggregation layer of insulating material particles 3A fixed thereon and a negative electrode wide member 20 having the insulative material particle aggregation layer 3B fixed thereon and then cutting them. That is, as shown in FIGS. 30 and 32, a positive electrode wide member 10 having the aggregation layer of insulating material particles 3A fixed thereon, and a negative electrode wide member 20 having the aggregation layer of insulating material particles 3B fixed thereon are at first formed in the same manner as in the fourth embodiment. Then, after coating a solution capable of dissolving a binder to one of the surfaces of both of the aggregation layer of insulating material particles 3A and 3B, they are immediately stacked with the aggregation layer of insulating material particles 3A and 3B being opposed to each other and then pressed and dried. When the positive electrode wide member 10 and the negative electrode wide member 20 thus integrated together are cut in perpendicular to the plane of the sheet at the gaps, the integrated layer described above is formed.

Further, the integrated layer may also be formed, as shown in FIG. 21, by using a positive electrode wide member having the aggregation layer of insulating material particles 3A fixed thereon and the negative electrode wide member not having the aggregation layer of insulating material particles, coating a solvent capable of dissolving a binder to the surface of the aggregation layer of insulating material particles 3A of the positive electrode wide member, the integrating positive electrode wide member 10 and negative electrode wide member 20 as described above, and cutting that in the same manner as described above.

INDUSTRIAL APPLICABILITY

As has been described above, the first battery according to the present invention can prevent falling of the active material particles from the end face of the sheet-like electrode, to avoid internal short circuit caused by manufacturing steps.

The second battery and the fourth battery according to the present invention can prevent falling of the active material particles from the end face of the sheet-like electrode to avoid internal short circuit caused by manufacturing steps, as well as can increase the battery capacity of the electrode plate laminate contained in a battery can of an identical size without increasing the thickness of the active material layer.

The third battery according to the present invention can provide a non-aqueous secondary battery equipped with a flat electrode plate laminate in a flexible casing, having a relatively high degree of freedom for the shape of the battery and thin thickness, which is excellent in discharging characteristics at a high current density and cycle characteristics.

According to the manufacturing method of a non-aqueous secondary battery according to the present invention, it is possible to obtain a non-aqueous secondary battery according to the present invention easily and efficiently.

What is claimed is:

1. A non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein the separator is an aggregate layer of insulating material particles formed by bonding insulating material particles to each other by a binder and fixed to at least one of the positive electrode and the negative electrode, and an end face of at least one of the positive electrode active material layer and the negative electrode active material layer is at least partially coated with the aggregate layer of insulating material particles.

2. A non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein an end face of at least one of the positive electrode active material layer and the negative electrode active material layer is at least partially coated with an aggregation layer of insulating material particles, the positive electrode active material layer is formed to such a size as not overhanging the negative electrode active material layer paired therewith as a cell layer, and the separator is the aggregation layer of insulating material particles formed by bonding insulating material particles to each other by a binder and fixed to at least one of the positive electrode and the negative electrode, and is disposed so as to cover at least an entire surface of the positive electrode active material layer opposed to the negative electrode and so as not to overhang an end face of the current collector.

3. A non-aqueous secondary battery according to claim 2, wherein the end face of the positive electrode active material layer is at least partially coated with the aggregate layer of insulating material particles.

4. The non-aqueous secondary battery according to claim 2 or 3, which has an insulating layer interposed between the current collectors of both of the electrodes, and the insulating layer is fixed to at least one of the positive and negative current collectors and disposed so as to cover at least an entire surface of the positive electrode current collector opposed to the negative electrode current collector so as not to overhang the end face of one of the current collectors.

5. A non-aqueous secondary battery according to any one of claims 1 to 3, wherein the electrode plate laminate comprises one or more of laminated integrated layers each of which is prepared by integrating both of the electrodes and the separator between the active material layers of both of the electrodes.

6. The non-aqueous secondary battery according to claim 3, wherein the insulating material particles constituting the aggregation layer of the insulating material particles comprise an inorganic material.

7. A method of manufacturing a non-aqueous secondary battery, which comprises forming a positive electrode member by forming a positive electrode active material layer to at least one surface of a sheet-shaped positive electrode current collector, within the size of the current collector determined for an electrode plate laminate, such that a margin is present at a periphery of the current collector, forming an aggregation layer of insulating material particles formed by bonding insulating material particles to each other by a binder to the positive electrode member so as to cover a top surface and an end face of the positive electrode active material layer, then cutting the positive electrode member integrated with the aggregate layer of insulating material particles from the position of the margin of the positive electrode current collector in a direction perpendicular to a plane of the sheet-shaped positive electrode current collector to prepare a positive electrode having the aggregation layer of insulating material particles fixed thereon as a separator having an electrolyte solution permeability, and forming an electrode plate laminate by using the positive electrode and a negative electrode of a predetermined size having a negative electrode active material layer fixed to at least one surface of a sheet-shaped current collector, such that the positive electrode active material layer does not overhang the negative electrode active material layer paired therewith as a cell layer.

8. A method of manufacturing a non-aqueous secondary battery, which comprises forming a positive electrode member by forming a positive electrode active material layer to at least one surface of a sheet-shaped positive electrode current collector, within the size of the current collector determined for an electrode plate laminate, such that a margin is present at the periphery of the current collector, forming an aggregation layer of insulating material particles formed by bonding insulating material particles to each other by a binder to the positive electrode member so as to cover a top surface and an end face of the positive electrode active material layer, then integrating a negative electrode member having a negative electrode active material layer on at least one surface of a sheet-shaped negative electrode current collector on the aggregation layer of insulating material particles with the negative electrode active material layer being faced thereto and then cutting the integrated positive electrode member and the negative electrode member from the position of the margin of the positive electrode current collector in a direction perpendicular to a plane of the sheet-shaped positive electrode current collector, thereby forming an integrated layer which is formed by interposing the aggregation layer of insulating material particles as a separator having an electrolyte solution permeability between the active materials of both of the electrodes and integrating the separator and both of the electrodes, and laminating the integrated layer by one or more integrated layers to form an electrode plate laminate.

9. A method of manufacturing a non-aqueous secondary battery, which comprises forming a positive electrode member by forming a positive electrode active material layer to at least one surface of a sheet-shaped positive electrode current collector, within the size of the current collector determined for an electrode plate laminate, such that a margin is present at a periphery of the current collector, forming an aggregation layer of insulating material particles formed by bonding insulating material particles to each other by a binder to the positive electrode member so as to cover a top surface and an end face of the positive electrode active material layer, then forming a negative electrode active material layer on the aggregation layer of insulating material particles and then cutting the integrated positive electrode member and the negative electrode member from the position of the margin of the positive electrode current collector in a direction perpendicular to a plane of the sheet-shaped positive electrode current collector, thereby forming an integrated layer which is formed by interposing the insulation material particle aggregation layer as a separator having an electrolyte solution permeability between the active materials of both of the electrodes and integrating the separator and both of the electrodes, and laminating the integrated layer by one or more integrated layers to form an electrode plate laminate.

10. A non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein the separator is an aggregation layer of insulating material particles formed by bonding insulating material particles to each other by a binder and fixed to at least one of the positive electrode and the negative electrode, an end face of at least one of the positive electrode active material layer and the negative electrode active material layer is at least partially coated with the aggregation layer of insulating material particles, the insulating material particles constituting the aggregation layer of insulating material particles comprise an inorganic material, and an insulating layer interposed between the current collectors of both of the electrodes, and the insulating layer is fixed to at least one of the positive and negative current collectors and disposed so as to cover at least an entire surface of the positive electrode current collector opposed to the negative electrode current collector and so as not to overhang an end face of the positive electrode current collector.

11. A non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein the separator is an aggregation layer of insulating material particles formed by bonding insulating material particles to each other by a binder and fixed to at least one of the positive electrode and the negative electrode, an end face of at least one of the positive electrode active material layer and the negative electrode active material layer is at least partially coated with the aggregation layer of insulating material particles, the insulating material particles constituting the aggregation layer of insulating material particles comprise an inorganic material, and the electrode plate laminate comprises one or more of laminated integrated layers each of which is prepared by integrating both of the electrodes and the separator between the active material layers of both of the electrodes.

12. A non-aqueous secondary battery having, in a casing, an electrode plate laminate having at least a positive electrode and a negative electrode in which an active material layer is fixed to at least one surface of a current collector and a separator having an electrolyte solution permeability interposed between the active material layers of both of the electrodes, with a non-aqueous electrolyte solution being poured and sealed in the casing, wherein the separator is an aggregation layer of insulating material particles formed by bonding insulating material particles to each other by a binder and fixed to at least one of the positive electrode and the negative electrode, an end face of at least one of the positive electrode active material layer and the negative electrode active material layer is at least partially coated with the aggregation layer of insulating material particles, the insulating material particles constituting the aggregation layer of insulating material particles comprise an inorganic material, the electrode plate laminate comprises one or more of laminated integrated layers each of which is prepared by integrating both of the electrodes and the separator between the active material layers of both of the electrodes, and an insulating layer interposed between the current collectors of both of the electrodes, and the insulating layer is fixed to at least one of the positive and negative current collectors and disposed so as to cover at least the entire surface of the positive electrode current collector opposed to the negative electrode current collector and so as not to overhang an end face of the positive electrode current collector.

* * * * *